(12) United States Patent
Clair et al.

(10) Patent No.: US 8,533,326 B2
(45) Date of Patent: *Sep. 10, 2013

(54) METHOD FOR MANAGING, ROUTING, AND CONTROLLING DEVICES AND INTER-DEVICE CONNECTIONS

(75) Inventors: Gordon Saint Clair, San Francisco, CA (US); Frederick M. Johnson, San Francisco, CA (US); Amy M. Badore, Oakland, CA (US); Charles Rotter, San Francisco, CA (US); Kamal Shah, Oakland, CA (US)

(73) Assignee: CLoud Systems Inc., Oakland, CA (US)

( * ) Notice: Subject to any disclaimer, the term of this patent is extended or adjusted under 35 U.S.C. 154(b) by 344 days.

This patent is subject to a terminal disclaimer.

(21) Appl. No.: 11/744,095

(22) Filed: May 3, 2007

(65) Prior Publication Data

US 2007/0282748 A1  Dec. 6, 2007

Related U.S. Application Data

(60) Provisional application No. 60/825,086, filed on Sep. 8, 2006, provisional application No. 60/746,290, filed on May 3, 2006.

(51) Int. Cl.
*G06F 15/173* (2006.01)

(52) U.S. Cl.
USPC ........... 709/225; 709/218; 709/223; 370/248; 370/351; 370/466

(58) Field of Classification Search
USPC .................................................. 709/223–226
See application file for complete search history.

(56) References Cited

U.S. PATENT DOCUMENTS

| | | | |
|---|---|---|---|
| 6,192,281 B1* | 2/2001 | Brown et al. | 700/2 |
| 6,201,810 B1 | 3/2001 | Masuda et al. | |
| 6,850,252 B1 | 2/2005 | Hoffberg | |
| 2002/0007490 A1 | 1/2002 | Jeffery | |
| 2002/0078150 A1 | 6/2002 | Thompson et al. | |

(Continued)

FOREIGN PATENT DOCUMENTS

| | | |
|---|---|---|
| EP | 0877499 A2 | 5/1998 |
| EP | 1148687 A1 | 4/2000 |
| JP | 10-262072 | 9/1998 |
| JP | 2006-129528 | 5/2006 |

OTHER PUBLICATIONS

European Search Report dated Jan. 28, 2011, issued in EP 07761843.7.

(Continued)

*Primary Examiner* — Ian N Moore
*Assistant Examiner* — Jackie Zuniga
(74) *Attorney, Agent, or Firm* — Thompson Hine LLP

(57) ABSTRACT

A system and method for managing, routing and controlling devices and inter-device connections located within an environment to manage and control the environment using a control client is presented. A user provides commands via the control client to a server that maintains a representation of the environment and the devices within the environment. The server provides commands to devices present within the environment in response to user commands and other events, including events from the environment. The commands cause the devices in the environment to adopt specific desired states thereby causing the environment and the devices within the environment to create desired connections by and between the devices and to otherwise control and effect the environment.

20 Claims, 15 Drawing Sheets

(56) References Cited

U.S. PATENT DOCUMENTS

| | | |
|---|---|---|
| 2002/0087887 A1 | 7/2002 | Busam et al. |
| 2003/0037109 A1 | 2/2003 | Newman et al. |
| 2003/0065806 A1 | 4/2003 | Thomason et al. |
| 2003/0145109 A1 | 7/2003 | Nakashima |
| 2003/0163727 A1 | 8/2003 | Hammons et al. |
| 2004/0117438 A1 | 6/2004 | Considine et al. |
| 2004/0172396 A1* | 9/2004 | Vanska et al. ............ 707/9 |
| 2005/0002419 A1* | 1/2005 | Doviak et al. ............ 370/466 |
| 2005/0183120 A1 | 8/2005 | Jain et al. |
| 2005/0198040 A1 | 9/2005 | Cohen et al. |
| 2005/0267826 A1 | 12/2005 | Levy et al. |
| 2005/0276124 A1 | 12/2005 | Hasha |
| 2006/0101142 A1* | 5/2006 | Vasseur et al. ............ 709/225 |
| 2006/0179110 A1 | 8/2006 | Brown |
| 2006/0209795 A1 | 9/2006 | Chow et al. |
| 2006/0230064 A1 | 10/2006 | Perkowski |
| 2006/0234659 A1 | 10/2006 | Sakamoto |

OTHER PUBLICATIONS

International Search Report dated Feb. 12, 2008, issued in PCT/US2007/068165.

\* cited by examiner

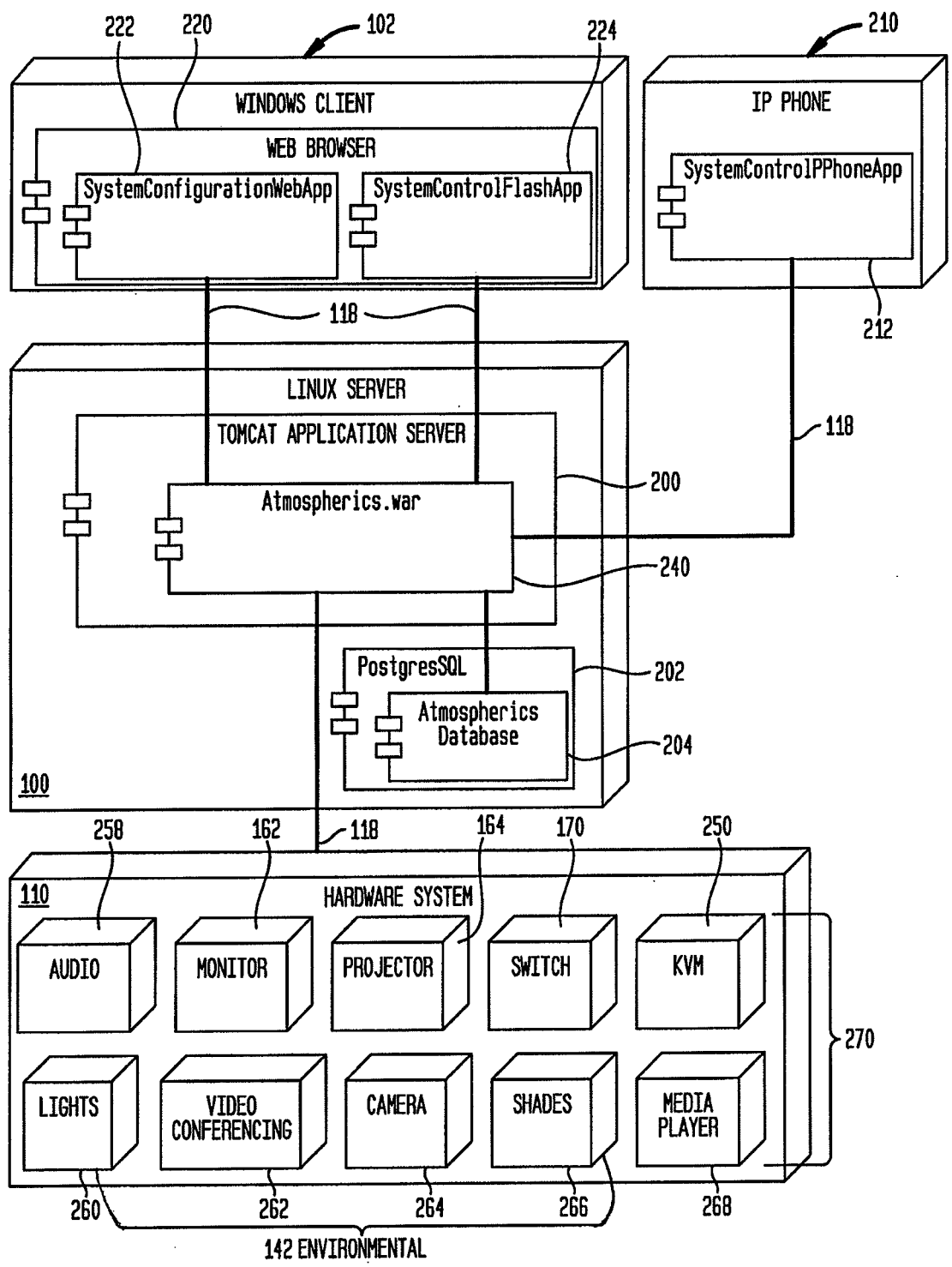

MANUAL CONFIGURATION PROCESS

METHOD FOR MANAGING, ROUTING, AND CONTROLLING DEVICES AND INTER-DEVICE CONNECTIONS

CROSS-REFERENCE TO RELATED APPLICATIONS

This application claims the benefit of U.S. Application No. 60/825,086, filed Sep. 8, 2006 and U.S. Application No. 60/746,290, filed May 3, 2006.

BACKGROUND OF THE INVENTION

Technical Field

The present invention relates to a system and method for controlling, managing and routing data among multiple devices that are sources or consumers of streaming data and control devices present in a given environment in a hardware independent manner. In one embodiment, audiovisual data streams and other controllable devices in a presentation environment are controlled by the present system and method. Other embodiments of the present system and method allow the manipulation and control of controllable devices in a variety of different environments. The present invention comprises a server adapted to communicate with and command local and remote devices in an environment, enabling connections to be established between selected devices to enable the flow of information, communications or other connections to be established between the selected devices in addition to providing a means to control and communicate with other devices that influence or sense the environment.

SUMMARY DISCLOSURE OF THE INVENTION

A system and method for managing and routing interconnections between devices connected via controllable switching devices and controlling the operation of the devices in a given user environment for the purpose of controlling and coordinating the operation of the user environment is presented. One embodiment of the present system and method is directed to the control of audio visual (A/V) and presentation environment control and sensing devices, and the routing and management of A/V information between generator or source devices and consumer or output devices. Source devices generate A/V data, A/V data streams, or more generally a signal that is delivered to consumer or output devices. The output devices receive the A/V data and in many cases render the A/V data in a form that is perceptible in the environment, for example one output device is a projector that would render the A/V data in a form that is visible to persons in the portion of the environment that is in proximity to the projector. The output devices are also referred to in some circumstances as consumer devices meaning that they accept information or other flows from the interconnection established with the source devices and in the case of an A/V environment they consume the A/V data.

The environment where the devices, connections and other controllable devices are located is referred to generically as a user environment. A type of user environment for A/V facilities is commonly referred to as a presentation environment. The presentation environment may span several physical rooms, buildings, or even multiple locations in geographically disparate locations depending on the circumstances and use of the system.

It is clear to one of ordinary skill in the art that a system for managing, routing, and controlling multiple streams of A/V data and other device communication and control signals is applicable to any system associated with an environment that requires the management, routing, and control of interconnections by and between different source devices and consumer devices as well as communication and control of a variety of devices in such environment. A non-exhaustive example of an alternative use for an embodiment of the present system and method is for a distributed data acquisition and control system whereby multiple sensors are distributed through a given facility or vehicle. The information from these sensors, such as accelerometers, are streams of data, similar in nature to a stream of A/V data. The consumers of the information generated by the sensors can be recording instruments and local feedback controllers that then actuate control lines to activate actuators that change the characteristics or states of the facility or vehicle.

One embodiment of the present system and method is used to manage, route and control these streams of information generated by sensors and consumed by recording instruments and local feedback controllers as well as other control signals. In another embodiment, the present system and method is used to manage, route and control integrated building systems to provide a full spectrum of building services ranging from heating, ventilating and air conditioning through radiation management, security and fire and safety systems. In still another embodiment the system is used to route, manage interconnections and control devices in a manufacturing or chemical process facility to coordinate and control the production of various products.

Although a majority of this disclosure is written in context of A/V systems and establishing connections by and between A/V devices and other discrete controllable devices to effect an A/V presentation environment, as these non-exhaustive examples show, one of ordinary skill in the art can use the present system and method for managing, routing, and controlling a variety of different types of devices and establishing connections between those devices for many different streams, including streams of A/V data, other types of signals, flows of fluids or movement of objects or products.

Multiple embodiments of a system and method for controlling multiple sources and sinks of A/V data streams and controlling specific devices is presented herein. Those of ordinary skill in the art can readily use this disclosure to create alternative embodiments using the teaching contained herein. The system and method of the present invention further solves the problems associated with the configuration of multiple devices present in an arbitrary environment whereby routes or paths must be configured by and between the devices to allow information to flow from device to device through the environment while simultaneously controlling the operation of selected devices within the environment, including without limitation the operation of detached devices that effect the environment, but are otherwise not directly connected to other devices in the environment.

BACKGROUND ART

Traditionally A/V management systems are custom designed, closed-system, hardware specific solutions designed to operate with only a limited number of hardware devices. However, the modern conference room, or media center requires the effective routing, coordination, processing, and management of multiple streams of audio visual information, or signals, generated from a variety of sources and being transferred to a wide array of different output devices or consumers of the information, generally referred to as output devices. Examples of these output devices range from projection and display systems to storage devices and external data links. An effective, open-architecture system to route, coordinate, process and manage these audio-video data streams is desirable to maximize the number of different sources and output devices required in a given environment while providing the ability to create adaptable, customized controls for sophisticated A/V systems thus enabling the creation of a highly integrated, tightly controlled presentation environment.

U.S. Patent Application Publication Number US2006/0234,569 A1 to Sakamoto discloses a wireless system consisting essentially of two devices, a controlled device and a controlling device. The controlling device broadcasts a control command to identify a specific controlled device. The controlled device receives the control data and uses the discrimination code to determine which controlled device is to receive the desired command. Specifically, the patent discloses a wireless center unit, or hub, that has a variety of different input ports for a variety of A/V devices. The specific inputs used by the wireless center are selected from the controlling unit via discrimination codes that select a desired input for a given A/V device. The wireless center receives the A/V data from the source device and then converts A/V data received from the selected input port into a specified native wireless stream of A/C data for transmission to a display that is linked to the wireless center unit. The system disclosed is limited in its inability to coordinate multiple inputs and outputs across wider areas, an inability to store specific configures, inability to command external devices, lack of user settings and configuration controls, need to convert signals prior to display and a requirement for point-to-point access. Further, the system disclosed by Sakamoto only contemplates a stream of A/V data that is converted into a format specific for a single output device. Therefore, there is a need for a system for controlling multiple sources and sinks of information and that allows a plurality of different input and output devices and environmental control devices to be controlled and commanded in a uniform manner by different users through the storage and access of configuration information.

U.S. Patent Application Publication Number US2003/0065,806A1 to Thomason discloses a networked system for displaying audio visual data that manages the connection between different sources to a display device to allow the display to auto-configure itself to display different types of source data. The system creates an ad hoc wireless link between the various available source devices and the display. The output device displays to the user any source devices that are available to be routed to the display device so the user may select the desired data stream to be displayed. The disclosed system is built around an ad hoc wireless network that is able to detect the existence of different source devices within range of the display device. There is no ability to establish persistent connections between different devices in the network. The disclosed system does not have any means of permissioning access to different sources and it, by default, only establishes point-to-point connections between the single display and multiple sources present in the environment. Further, the disclosed system lacks the ability to control other aspects of the environment, including the ability to control other detached devices that effect the environment that are not sources or consumers of A/V data, configure multiple devices and established routes between multiples devices located within an environment, control multiple sub-environments including output devices, nor provide for device specific rendered control interfaces for the user. Therefore, the disclosed system does not meet the need to control multiple sources and outputs of information, allow a plurality of different input and output devices to be configured and connected simultaneously, and control the environmental through separate control devices in a uniform manner by different users through the storage and access of configuration information.

U.S. Patent Application Publication Number US2005/0198,040A1 to Cohen discloses a networked home entertainment system that populates a simulation model based on the available audio/visual devices in the environment. The simulation model used in the disclosed system integrates the various device states available and interfaces with various environmental controls. The home entertainment system is based around a single node or star-based network configuration. Namely all of the devices in the environment are directly linked to the central media hub that includes a digital media adaptor that operates as an interface node to all of the devices and equipment in the environment. The device states and simulation model is used to create a user interface that attempts to obscure the complexity of the system configuration from the user and purports to use a simulation agent to configure setting and enable user level control. However the disclosure lacks detail on the operation of the simulation agent and how it configures specific settings and abstracts the underlying network system from the user interface. Further, the system requires a central media hub to accept and output all of the information flowing through the environment. Thus, there is no ability to directly connect remote devices independent of the media hub, thereby limiting the ability of the disclosed system to handle complex environments with multiple sources and output devices operating simultaneously. As a result a need exists for a system and method to provide the management, routing and control of multiple devices in an environment to route signals through the environment to control and effect the configuration and operation of the environment.

U.S. Pat. No. 6,850,252B1 to Hoffberg discloses an intelligent electronic appliance that models the user and attempts to adapt the user interface presented to the user during operation based on interactions with the user and the type of media content presented to the appliance. This system provides for an adaptable user interface based on the context and type of information being presented and available for the user to access, but it bases the interaction and information on the specific content of the data provided. The disclosed system fails to disclose any data specific routing for the identified data stream and performs all analysis and identification of the data stream based on the data content present within the data stream. Effectively the disclosed system samples the data stream to determine the data content present within the data stream. Then the disclosed system provides options to the user based solely on the singular device and the type of data stream available based on this sensing operation. Thus a need exists for a system capable of providing a customized user interface for the control of an environment whereby the options available to the user are provided based on the capabilities of the network and the devices in the environment and the permission levels or access levels available for a given user in the environment.

BRIEF DESCRIPTION OF THE DRAWINGS

The accompanying figures depict multiple embodiments of the system and method for routing, controlling, and managing streams of data and more particularly streams of audio visual information. A brief description of each figure is provided below. Elements with the same reference numbers in each figure indicate identical or functionally similar elements.

Additionally, the left-most digit(s) of a reference number identifies the drawings in which the reference number first appears.

FIG. 2 is a block diagram highlighting the logical components of an embodiment directed to the management, routing and control of audio visual and presentation environment control devices.

MODES FOR CARRYING OUT THE INVENTION

Audio Visual Control System Architecture

Figure 1A:
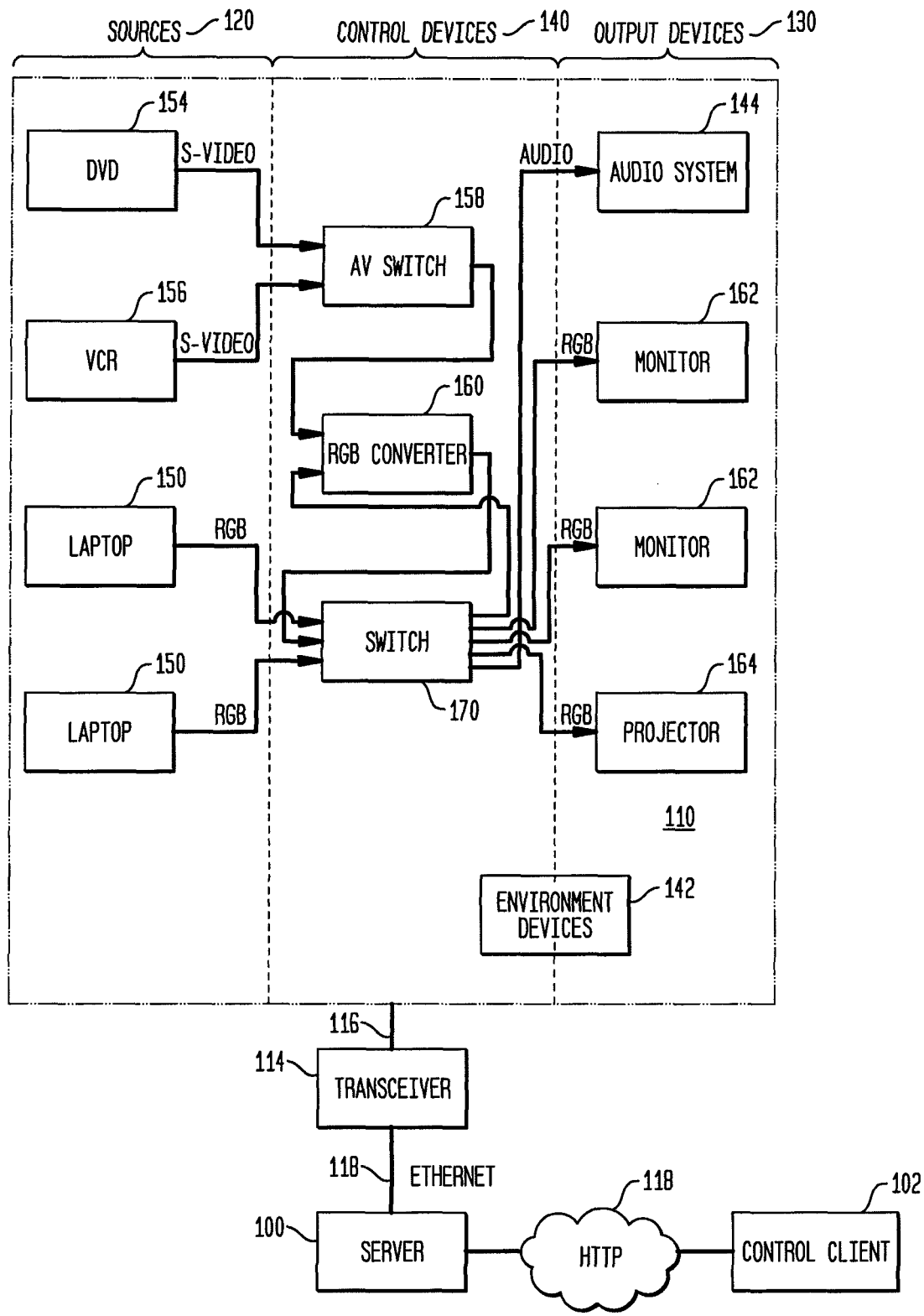
FIG. 1a is a block diagram outlining the physical architecture of an embodiment of the present system and method for audio visual ("A/V") control and integration.

FIG. 1a depicts multiple representations of an embodiment of the present system and method for audio visual control and integration in one embodiment of an exemplary physical configuration of a presentation environment 110, as shown in FIG. 1a. In this exemplary configuration, the server 100 comprises a first communication interface adapted to communicate with a remotely connected control client 102. The control client 102 is adapted to accept information from the server 100 to render or create on the control client 102 a user interface. The user interface enables a user to manage, route and control the flow of A/V data between different sources 120, output devices 130, and control or switch devices 140, and the communication and control of other detached devices or environment devices 142, not present in the routing and control of the flow of A/V data such as environment sensors and actuators that are associated with the presentation environment 110 (all collectively referred to herein as "devices" 270) located within or associated with the presentation environment 110. Although the server is shown external to the presentation environment 110 in FIG. 1a, in other embodiments the server 100 is physically located within the presentation environment 110 or provided as an integral element of one of the devices 270.

Specifically, in the case of the embodiment depicted in FIG. 1a, the server 100 and the control client 102 are connected via a network 118. A network 118 as defined in this specification is any transmission medium that supports a protocol allowing communication by and between devices connected to the network as would be understood by one of ordinary skill in the art. One example of a network 118 is the Internet which utilizes the TCP/IP (Transmission Control Protocol/Internet Protocol) protocol, but the term network 118 as defined is also meant to include local access networks (LANs), wireless LANs, a multi-device serial network, and any other computer communication network, including various forms of powerline networking and X10 type networks. In still another embodiment, a first communication interface allows point-to-point communication between the server 100 and the control client 102 using a serial interface, point-to-point modem, or similar types of point-to-point communication devices and protocols known to those of ordinary skill in the art.

The server 100 in this embodiment is connected via the network 118 to a communication transceiver 114, for example a terminal server. The communication transceiver 114 converts physical communication mediums and logical protocols without altering the message being carried, thereby allowing commands sent in one communications format which is suitable to the sender to be converted into another communication format suitable for the receiver. In this case a command issued by the server 100 via TCP/IP over an Ethernet network 118 is converted to the same command sent over a point-to-point RS-232/RS-485 serial link, which becomes a control signal 116 that is input to a device 270. Any communication sent from a device 270, for example an acknowledgement sent by the device 270 back to the server 110, is similarly reconverted by the communication transceiver 114. The communication transceiver 114 thus provides a second communication interface for the server 100 allowing commands and information to be exchanged between the server 100 and devices 270 associated with the presentation environment 110.

In alternative embodiments, the communication transceiver 114 is eliminated and a direct communication linkage, such as a Universal Serial Bus (USB) link, is established from the server 100 to a device 270 to be controlled. In another embodiment, the server 100 communicates directly with network capable devices 270 over the computer network 118. In another embodiment, the server 100 communicates with a variety of devices 270 using a communication transceiver 114 for a subset of devices 270, direct communication for another subset of devices 270, and communication over a network 118 to yet another subset of devices 270. In still another embodiment, the server 100 communicates with the devices 270 using a wireless communication protocol, for example, infrared or visual/near-visual optical communication or radio frequency wireless protocols such as RF, Bluetooth, WiFi/802.11x, WiMax, and Zigbee and others known to those of ordinary skill in the art.

In the embodiment of FIG. 1a, the control signals 116 output from the communication transceiver 114 are used to control multiple devices 270 including a switch 170 and second switch 158. The control signals 116 select streams of audio video data coming from a variety of sources 120 and route them to a variety of output devices 130. The switch 170 functions as an electronic patch panel that allows inputs to the switch 170 to be selectively routed or directed to selected outputs from the switch 170. In this embodiment the switch 170 supports a single type of video input, namely RGB (Red-Green-Blue color) signals, and an audio input. Source devices 120 that have RGB outputs, such as laptop computers 150, can be directly connected to the switch 170. Non-RGB sources 120 are input instead to the second switch 158. The use of a second switch 158 in this embodiment supports the various types of non-RGB signals, for example S-Video, Composite, or Component video signals from sources 120 such as a DVD 154 and a VCR 156. The outputs from the second switch 158 are then converted to RGB signals using an RGB converter 160 before being input to the switch 170. The RGB converter 160 in other embodiments can be integrated into the second switch 158. Any of these sources 120 of A/V information can be routed to any of the attached output devices 130 such as a monitor 162 or projector 164 through appropriate commands issued by the server 100 to the switch 170 and second switch 158.

Other embodiments allow geographically or physically dispersed locations to be accessed and controlled from a single server 100. For example in one embodiment a transceiver 114 located in one portion of a presentation environment 110 is used to address devices 270 located in that one portion of the presentation environment 110 while the server 100 is located at a geographically remote second location that is separated from the one portion of the presentation environment 110 and only accesses the one portion of the presentation environment 110 via the transceiver 114 or direct links to the devices 270 in that one portion of the presentation environment 110. In still another alternative embodiment, high-speed data connections between locations and additional devices 270 for compressing, decompressing, and forwarding audio video and control information between locations are used to allow the physical separation of source devices 120 from output devices 130 across longer distances thus allowing geographically distributed management, routing and control of an integrated presentation environment 110 spread across a number of dispersed locations. Even in a unitary presentation environment 110, for example a presentation environment 110 comprising a number of rooms within a single building, it is common to include switching and converter equipment such as the RGB Converter 160 to transform high definition (HD) video signal signals in either analog or digital formats such as the analog Component Y/Pb/Pr format and digital High-Definition Multimedia Interface (HDMI) into other standards suitable for display on non-HD devices for example. The reverse can be implemented to support old signal formats on new HD devices. Similarly, converters for playing audio on existing audio systems 144 can also be supplied for new analog and digital audio standards and associated interfaces, including but not limited to the AC-3, Dolby® Digital® 5.1 and 7.1 standards and S/PDIF interfaces.

Each of the links drawn between specific elements of the presentation environment 110 represent static connections that exist in the presentation environment 110. The topology of these static connections are stored as part of the server's 100 configuration for a given presentation environment 110 as an environment model that represents the devices 270 and other details of the presentation environment 110. The server 100 is configured with information regarding the types of connections that can be made and the equipment or devices 270 available in the presentation environment, such as one or more switches 170, that enables the server 100 to make those connections and route the information between the individual devices such as the DVD player 154 and the projector 164. The switches 170 create interconnections that associate or connect the various static connections, thereby creating a path or a linkage between devices 270 allowing them to communication by and between each other. An interconnection in some embodiments possesses attributes associated with the type of static connections that are linked together. For example a static connection linking an RGB output port from a source device 120 to a switch 170 is associated as carrying a video signal by virtue of the ports, or nodes on a given device 270 that are linked together. The specific interconnections established between devices 270 as well as the device control and the device state attributes, or device configuration, associated with a specific presentation environment 110 state are referred and stored in the server 100 as scenes. A scene thus creates a representation, or state model, of the devices 270 in the environment 110. The use of scenes to define various device states allows a user to rapidly recreate a given environment state, representing specific device states and interconnections, by retrieving a specific scene.

In the embodiments of the present system and method adapted for use managing and controlling A/V environments, the term scene is used to generically describe something that in other environments might be referred to as a macro. Effectively a scene represents a group of events or commands that are issued to the devices 270, including queries of device states, necessary to configure a specific user environment in a desired manner. Similarly, a presentation, which represents groups of scenes, can be considered a grouping of macros.

In the embodiment shown in FIG. 1*a*, the server 100 issues control signals to the communication transceiver 114 that manipulate specific devices 270 in the presentation environment 110 to create a specific room configuration or state. As part of a particular configuration of the state of the presentation environment 110, the devices 270 are manipulated to create specific routing between different source devices 120 and output device 130. Further, the control signals transferred through the communication transceiver 114 can also be sent to specific sources or source devices 120 and output devices 130 in order to configure, monitor, or control specific information associated with those source devices 120 and output devices 130. Further, control signals output from the communication transceiver 114 can also be attached to other physical actuators, sensors, or other systems such as lighting control modules or motor controls associated with projection screens and windows coverings, generically referred to as, environmental controls, environmental sensors, or environment devices 142. These environment devices are also referred to alternatively as detached devices, meaning that the devices sensor or influence the environment, but they are not a part of the routing of signals through the environment. Using these environmental controls 142, in the embodiment shown, the server 100 is capable to adjusting lighting and other aspects of the presentation environment 110. Thus, the server 100 is able to issue commands through the communication transceiver 114 to manage, route and control the flow of A/V information and actuate environment controls 142 located within specific rooms and other spaces located in the presentation environment 110 in a manner that allows the presentation environment to be readily reconfigured and controls in a variety of ways.

Types of Connections

For an A/V system, there are typically three types of connections to be made:
  Video;
  Audio; and,
  Control.

Figure 1B:
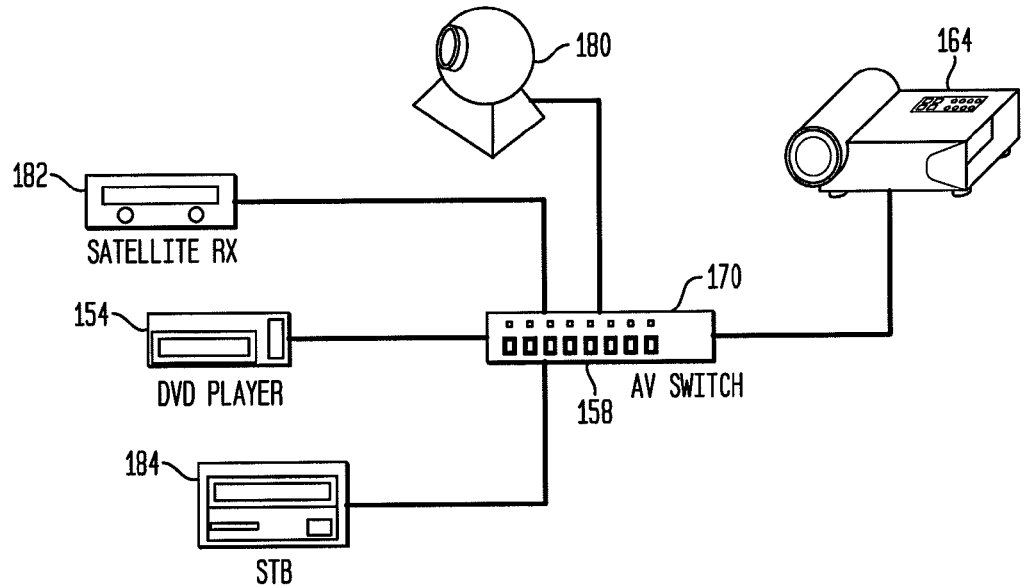
FIG. 1b is diagram depicting a signal level diagram of an embodiment of an A/V system.
Figure 1C:
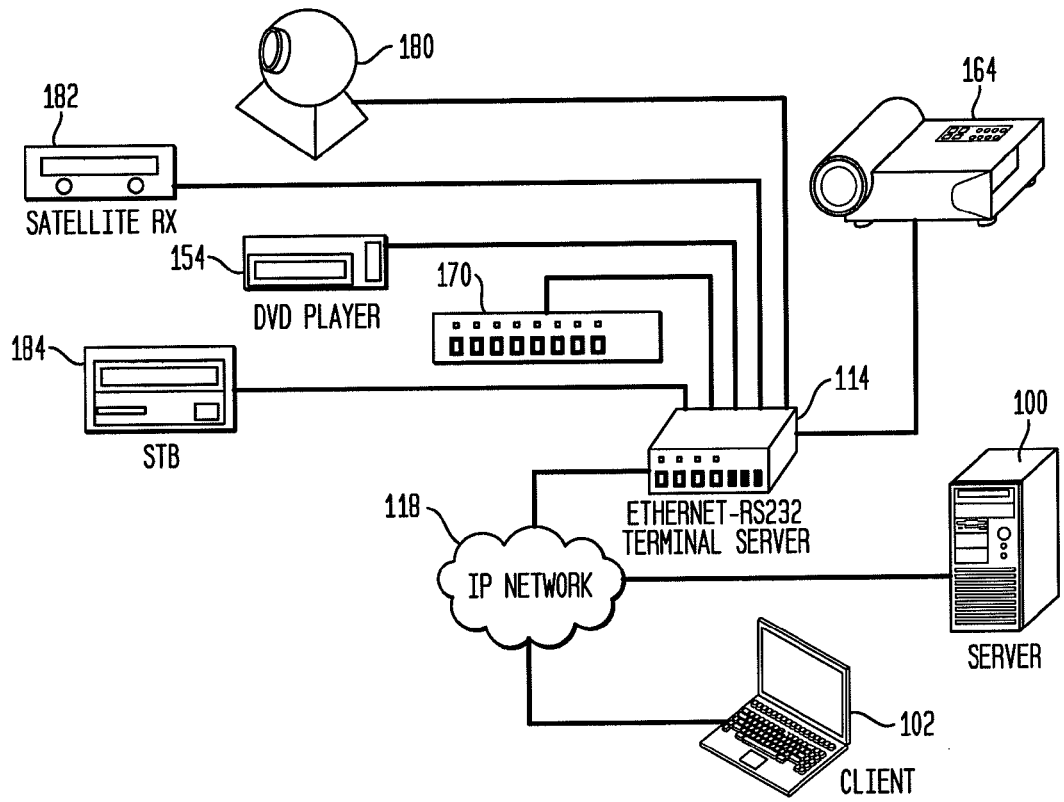
FIG. 1c is a depiction of a control or command level diagram of an embodiment of an A/V system.

The first of two of these types are the signal levels and can be grouped together on the same diagram as shown in FIG. 1*b*. The control or command level can be depicted separately as shown in FIG. 1*c*. The architecture of the present system and method allows the separation of command communication from the data or signal communication links. This separation is useful in certain circumstances to ensure that command communications are not hindered or interrupted by the flow of data in the environment.

In the embodiment shown in FIG. 1b, the audio and video signal level connections are made between the different sources of video and audio information such as a webcam 180, a satellite receiver 182, a DVD player 154, a set-top box 184, or audio video data from a second switch 158, and output devices, in this FIG. 1b, there is a single consumer or output device 130, a video projector 164. The connection between these multiple sources of A/V data and the output device is through a switch 170. The control or command level schematic shown in FIG. 1c enables the server 100 to control the operation of the switch 170 and the plurality of A/V sources 120 and output devices 130 in the presentation environment 110 by passing commands through a network 118 to a communication transceiver 114 that translates the commands issued by the server into specific control signals 116 output from the communication transceiver 114 to the sources 120, output devices 130, and the switch 170. By use of a communication transceiver 114, the server 100 is abstracted from the actual physical medium or protocol used by the devices 270 for controlling the flow of signals through the presentation environment 110, such as switches 170, sources 120 and sinks 130 of information or for controlling the environment controls 142. In the embodiment shown in FIG. 1a and FIG. 1c, the communication transceiver 114 converts commands from the server 100 to device specific control signals 116. The types of control device connections can in alternative embodiments include a number of connections known to those of ordinary skill in the art including but not limited to the following exemplary connections: RS-232/RS-485 serial ports, Ethernet, Universal Serial Bus (USB), Infrared such as IrDA, RF, and other wireless connections.

Although the embodiments depicted in FIG. 1a, FIG. 1b, and FIG. 1c depict a single communication transceiver 114, multiple communication transceivers 114 can be spread throughout a facility, or even multiple physically disparate locations to enable the server 100 to control multiple A/V environments with only the need to connect to them via an IP network 118 such as the Internet or company Intranet. In this manner it is possible for a single server 100, operated by a single client 102 to control a broad environment and effectively control multiple A/V presentation environments 110 in physically isolated locations and manage the experiences of people in each of those presentation environments 110.

Hardware System

FIG. 2 is a block diagram highlighting the logical components of one embodiment of the present system and method adapted for audio visual device management, routing and control. Specifically the present system and method is structured as client/server control application. The server application, generally referred to as the server 100, operates on a general purpose computing platform, such as a Windows or Linux platform, maintains a database 202 or other data store that stores details describing the control environment and its configuration, and issues the control commands in response to commands sent from the control client 102. The control client 102, also known as a control panel provides a means for controlling the system through a user interface, a graphical user interface or other application to enable control of devices 270 in the presentation environment 110. In some embodiments the control client 102 includes the ability to use of preset and saved system states, which are referred to as scenes and to enable groups of scenes to be presented in sequence, which are referred to as presentations.

Server

The server 100, provides a location for the control and storage of multiple components and elements of the present system and method. In the embodiments depicted, the server 100 is shown as a single unitary machine that can interface with multiple control clients 102 and presentation environments 110. In alternative embodiments, the server 100 can be a multiplicity of physical machines working redundantly enabling hot-swap or fail safe capabilities across a network 118 or alternatively distributing computing and processing loads. In still another embodiment, the elements of the server 100 are distributed such that individual elements or components are distributed to different locations across a network 118. In one alternative embodiment a dedicated server 100 can be used solely as a server for the database 202 that hosts the application data 204 while one or more additional servers 100 connect to the database 202 via the dedicated server 100.

Server Functions

Some exemplary high-level functions of an embodiment of the server 100 include:

Manages users and user access.

Maintains lists of all devices and their configuration settings.

Maintains lists of presentation spaces or rooms and all devices available to each presentation space.

Maintains all information relating to scenes and presentations.

Provides control of all devices through classes and configuration information.

Maintains schedules of all presentations and prevents conflicts in scheduling for all devices.

In the embodiment depicted in FIG. 2, the server 100 is a computer running the Linux operating system. Although this embodiment the server is operating in a Linux based environment, a variety of different operating systems such as Windows and others can be used by one of ordinary skill in the art. The server 100 runs a web server 200 program to interface with control clients 102 to receive information and commands, provide feedback, implement the application rules necessary to run the system and perform the functions described herein, in addition to communicating with the presentation environment 110.

Web Server Component

The server 100 in the embodiment shown in FIG. 2 has a web server 200 for Java-based web applications, in this embodiment a Tomcat server. A Tomcat server is a Java-based web application container to run servlets and javaserver pages (JSP) for creating dynamic, web-enabled applications. Although the web server 200 shown in this embodiment is a Tomcat server, alternative methods of implementing the system and method disclosed herein are apparent to those of ordinary skill in the art. In the embodiment depicted in FIG. 2, the means for implementing the control server, shown as atmospherics.war 240 in the diagram, is deployed via the tomcat application or web server 200.

Database

Figure 9A:
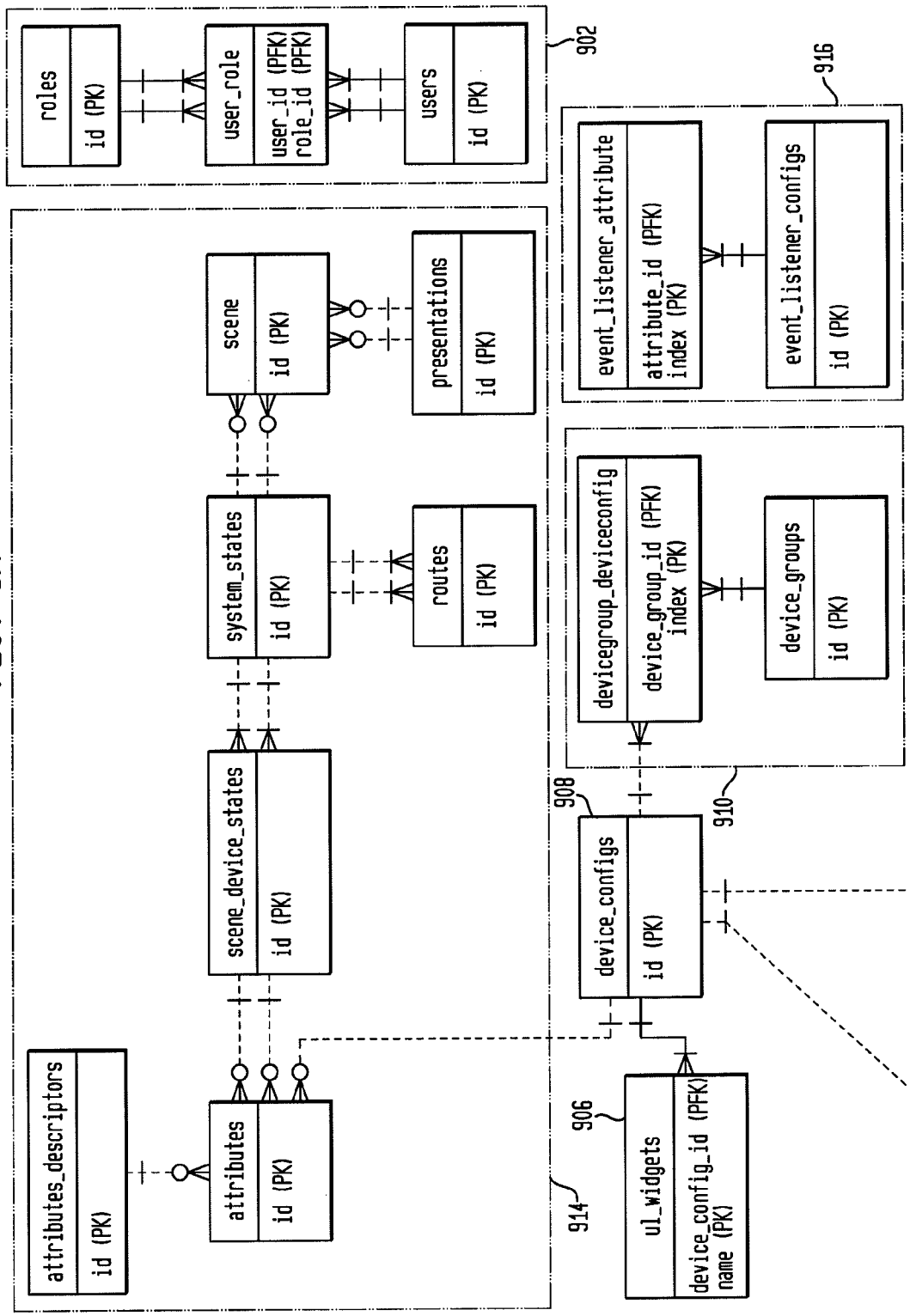
FIG. 9 is a data model of an embodiment of the system.
Figure 9B:
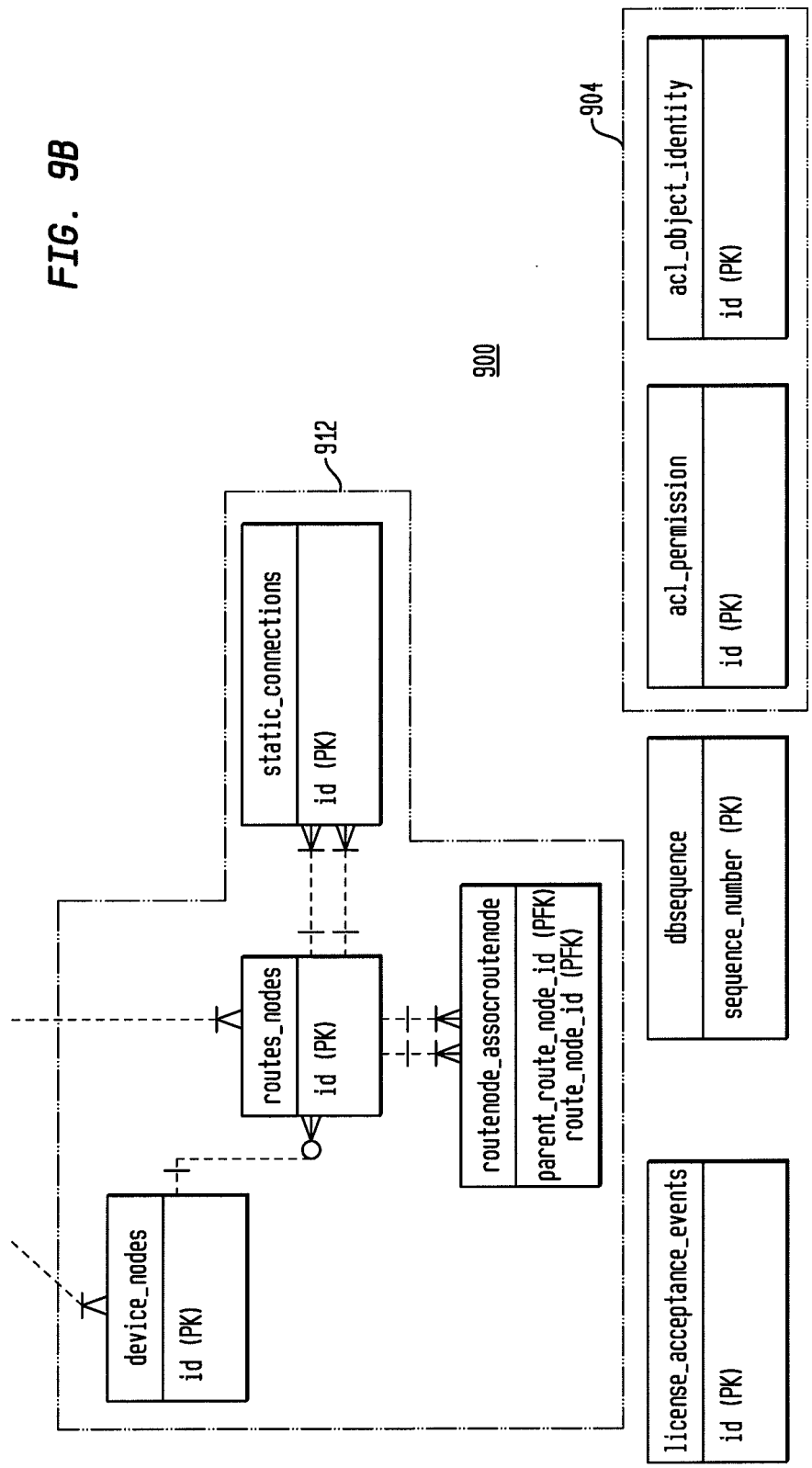

The database 202 implements a data model 900, an embodiment of which is depicted in FIG. 9. In the embodiment depicted in FIG. 2 and FIG. 9, the database 202 is a relational database, and more specifically a PostgresSQL relational database. In alternative embodiments, the database 202 can be implemented using a multiplicity of methods known to those of ordinary skill in the art including using object-oriented or associative databases or other data structures. Regardless of the type of database 202 used, the embodiment of the data structure depicted in FIG. 9 will provide a guide as to types of information stored within the database 202.

Many types of information are shown the embodiment of the data model 900 shown in FIG. 9 stored in the database 202. Some specific types of information are highlighted below:

- User information 902—that stores both individual user settings and preferences and works in conjunction with the access control level permissioning 904 to enable users to access specific configuration options, capabilities and system rights.
- User Interface Widgets 906—defines the specific user interface widget proto-elements that are linked to a device configuration and are integrated to create a set of controls and other user interface objects to be rendered on the control client 102. For example, the volume up-down element 880 can be considered an example of a user interface widget.
- Device configuration 908—handles information regarding the devices, including output devices and source devices and control devices to be controlled by the system and method.
- Device groups 910—maintains information regarding devices located in which presentation environments 110.
- Device connections and routing 912—holds information regarding specific physical static connections between different devices, and routing capabilities (e.g. available static connections that are physically capable in the room) that enable the server 100 to issue commands to control interconnections between source devices and output devices or issue other control device commands. Information contained within this data set is also used to restrict specific connections such as restricting the data sent to a speaker system to be only audio data or limiting the number of connections to or from a given device. The device connections and routing 912 provide an environmental model for the server 100 of the presentation environment 110 and the various devices 270 and other elements located within or associated with the presentation environment 110.
- Scene and presentation control 914—Stores information pertinent to a specific scene configuration or a series of different changes in system state over time, such as that embodied in a presentation where the presentation environment 110 is commanded to change state by implementing moving from one scene to another at different times, or in response to specific triggers.
- Event handling 916—provides controls and information for the server 100 to handle different changes in the system state, including different reporting operations and failure recovery and fault trapping details.

Application Server Architecture

Figure 3:
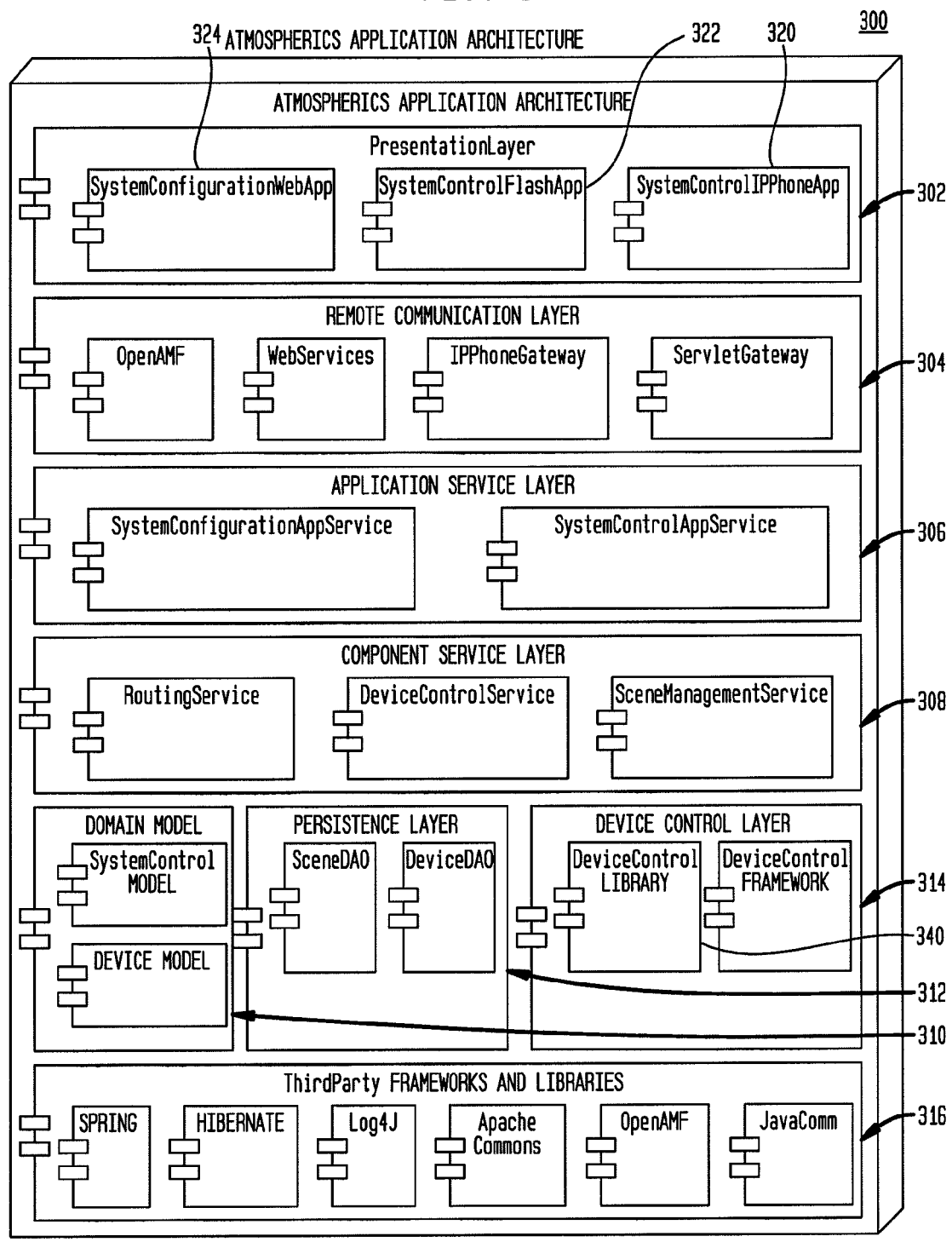
FIG. 3 is a component diagram of an embodiment of the server architecture.

An overview of the server application architecture 300 of the server 100 is depicted in FIG. 3. The server application architecture 300 shown in the embodiment depicted provides an overview of the interactions between different software elements comprising one embodiment of the server application architecture 300 of the system and method. The depicted embodiment details only one possible, exemplary architecture available to one of ordinary skill in the art for implementing the server application architecture 300 of the present system and method. The application service architecture 300 of the server 100 in the embodiment of the system shown in FIG. 2, is implemented within the atmospherics.war 240 component of the tomcat application server, or web server 200.

The server application architecture 300 comprises a number of discrete modules. A description of a selected number of the discrete modules is provided below.

Presentation Layer

The presentation layer 302 provides the primary user interfaces for control clients 102 connecting to the server 100. There are three primary user interface apps, 320, 322, and 324 that generate a user interface for a given control client 102 based on the information provided by that control client 102 including the user, permission levels, presentation environment 100 and other factors. The first of the three user interface apps are a system configuration web app 324 allowing a user to configure the system. The second is the system control flash app 302 that enables a control client 102 to control devices, and create and store scenes and presentations. The third is a control phone app 320, that provides user interface specific information and controls to the control client 102 to enable it to control a phone, such as a VoIP Phone 210 and to render a control panel on a VoIP Phone 210 thereby enabling inputs by a user to a VoIP Phone 210 are able to issue control commands to the server 100 that in turn reconfigures the presentation environment 110 based on the desired inputs. The control phone app 320, although it specifically describes controlling a phone, it is obvious to one of ordinary skill in the art that other network or internet enabled devices could also be interfaced with the system via a user interface app similar in nature to the control phone app 320.

Remote Communication Layer

The remote communication layer 304 supports a variety of high-level services for handling communication sessions with the server 100.

Application Service Layer and Others

The application service 306 provides the back end processes and business logic necessary to operate the system and respond to specific system events and user inputs. The application service layer 306 works together with the component service layer 308, the domain model 310, persistence layer 312, and device control layer 314 to respond to user input provided from a control client 102 and thus allows the system to manage, route, and control multiple A/V sources and output devices as well as other devices. Within the application service 306, an event engine as described below, is used to generate, monitor and handle different actions, triggers, and changes in the system. Underlying the server application architecture 300 are multiple off-the-shelf and customized third party frameworks and libraries 316 that provide common functionality to the application service 306.

Device Control Library

Within the device control layer 314, a device control library 340 is provided. The device control library 340 provides interface specifics and details needed by the server 100 to interpret specific device 270 attribute information received for a given type, make and model of a device 270 and also how to structure commands suitable for the given type, make and model of the device 270 to be part of the controlled user environment. The device control library 340 in some embodiments also maintains specific details on how to communicate, monitor and respond to specific communications or responses provided by the device 270 being controlled. For example, the device control library 340 can provide details of how to structure instructions to a specific type of audio system 144 to raise and lower the volume. The same device control library 340 driver for the same audio system 144 in some embodiments also provides a monitoring function that communicates with the audio system 144 to detect faults or other problems and report the details of those respective fault events to the system for response. The contents of the device control library 340 are updateable from time to time by the user upon demand and via query to remote license and driver servers.

Some exemplary types of are detached devices found in a device control library 340 adapted for use with an A/V system include environmental devices 142. Environmental devices 142 include control equipment that controls lighting in a room, including on/off switches, dimmable lighting and shades and other windows obscuring systems as well as temperature controls, power switches, and preset configuration controls. Other types of environmental devices 142 include sensors such as ambient light sensors, motion detectors, temperature sensors, humidity sensors, and switches or buttons present within the presentation environment 110.

Control Client

The embodiment of the control client 102, as depicted in FIG. 2, is shown as a Windows® computer and the control client 102 is implemented using a standard internet or web browser 220 running on the computer. Although the embodiment shown depicts a Windows-based client interfacing with the server 100 through a web browser, multiple other embodiments include the use of a dedicated player, such as a standalone Adobe®/Macromedia® Flash® player or a Java® applet, or other method of accepting and interpreting the information provided by the server 100, receiving input from the user, and then transferring the command and control information back to the server 100. A number of other operating systems are readily supported as known to those or ordinary skill in the art such as Windows® Mobile, Windows® CE, Mac® OS, Linux, BSD and others. By abstracting the user interface from the specifics of the control client 102, the system is able to render a user interface on a variety of different platforms running a range of different software while providing as much information and details as possible on the control client 102 relative to the capabilities of the control client 102. For example, in one embodiment, the server 100 evaluates the capabilities of the control client 102 upon log-in and then provides a customized user interface based on the ability of the control client 102 to handle the interface. In one embodiment, if the user logs into the server 100 via a handheld personal data assistant with limited display capabilities, the user interface is rendered to the control client 102 is rendered based on the details and capabilities of the personal data assistant and has possesses less information to be presented to the user. Other methods of creating a dynamic user interface on the control client 102 through communication with a server 100 can be implemented and are apparent to those of ordinary skill in the art.

The control client 102 in some embodiments is a thin-client such as a Voice over Internet Protocol (VOIP) phone 210 or another closed architecture device. The server 100 communicates with the closed or proprietary architecture device local system control phone app 212 through the system control phone app 320. The user can then input commands via the VoIP phone 210 that are supplied to the server 100 to change the state of the performance environment 110 and execute scenes and other programs. In some embodiments, the control client 102 is capable of providing a customized user interface 102 for the VoIP phone 210 that enables the user to access specific functionality on the server 100 using the menus and features of the VoIP phone 210 using either a specialized sub-application running on the VoIP phone 210 or using a generalized interface for to the VoIP phone 210.

System Control Client Architecture

The control client 102 in the embodiment depicted in FIG. 2 can operate two client-side web applications, a client system configuration webapp 222 for configuring the server 100 and a client system control webapp 224 for controlling a given presentation, scene or presentation environment 110. Access for a user to specific features and capabilities of the system through both the client system webapp 222 and the client system control webapp 224 are limited based on the specific rights and privileges associated with a given user. Further, for some users they are unable to access the client system configuration webapp 222 at all since they have limited user privileges.

System Configuration Webapp

The client system configuration webapp 222 local to the control client 102 and receives information from the server 100, and more specifically the system configuration webapp 324 that it renders into a user interface for the user using a player resident on the control client 102. In the case of the embodiment depicted in FIG. 2, the player is embedded within a web browser 220. The client system configuration webapp 222 on the control client 102 renders the user interface sent from the server 100 via the system configuration webapp 324 to allow the user to configure the server 100. Some exemplary configuration actions the user can take include defining elements or devices 270 in a specific presentation environment 110, including static connections within the presentation environment 110, creating and storing device 270 and system state details, i.e. storing scenes for present or future use, or ordering multiple scenes together into a presentation, and managing users and user rights. In one example, a user who logs into the server the system configuration webapp 222 on the control client 102 who does not have sufficient privileges to modify user accounts is not presented any option to access any screens to modify user accounts by virtue of the system configuration webapp 324 not transferring details of how to render the modify user account screens to the control client 102, thus the user interface only presents details and user interface objects to the user that the user has the ability to manipulate.

System Configuration Webapp Functionality

The system configuration webapp 324 renders for the user on the control client 102 via the client system configuration webapp 222 and thus enabling the user to adjust several important parameters of the server 100 to effect the operation of the system. Specifically, the system configuration webapp 324 allows a user with appropriate access privileges the ability to: add and remove devices 270; provide additional details to devices 270 including device names; serial numbers; asset tag numbers; purchase details and physical location information; associate various devices 270 with specific sub-environments or rooms in the presentation environment 110; manage users; provide pointers to specific device 270 background information and details including links to external uniform resource locators (URLs) for additional documentation; and, trouble shoot problems with devices 270. Thus the system configuration webapp 324 and the client system configuration webapp 222 provide the user with the ability to customize the server 100 and thus the operation of the system.

System Control Webapp

Figure 4:
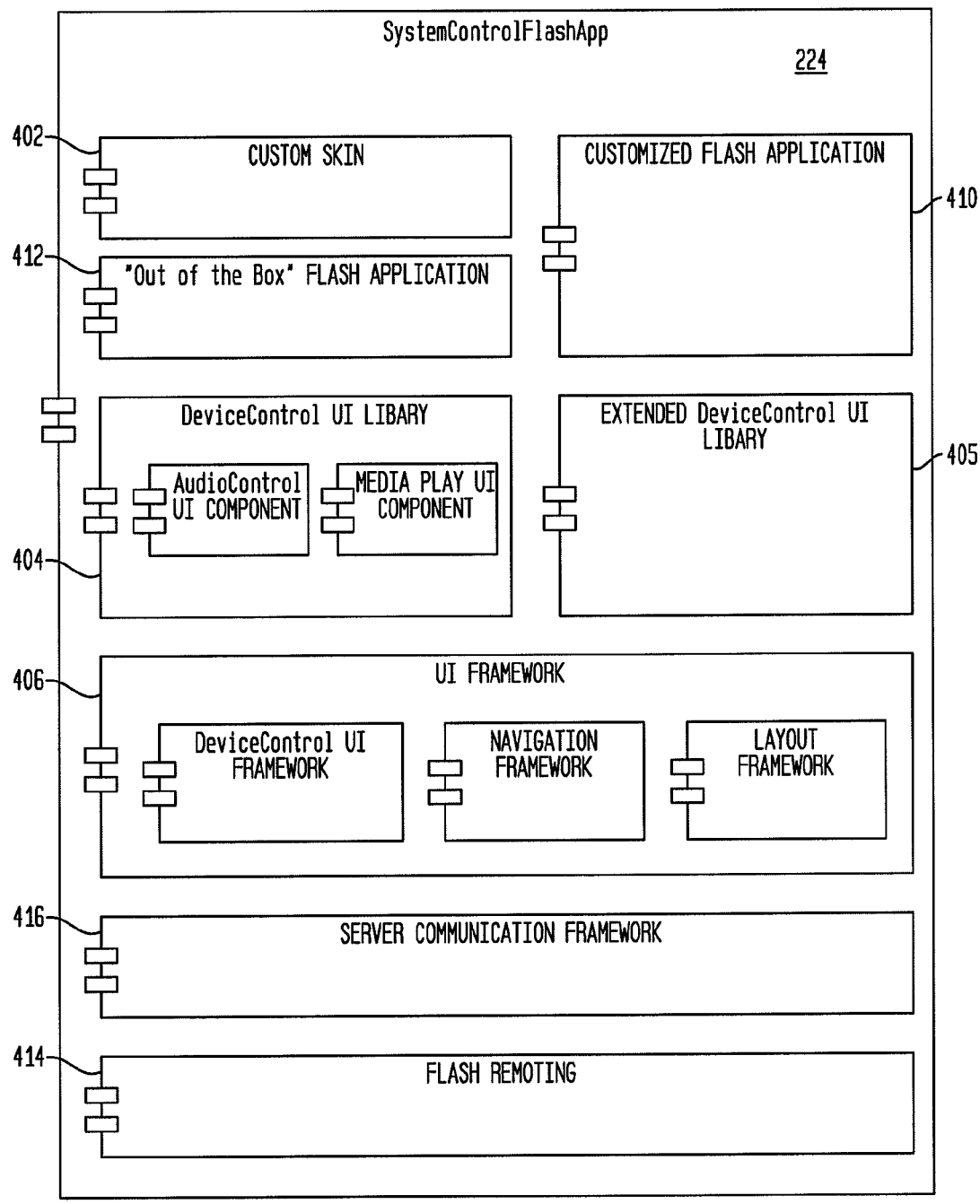
FIG. 4 is a component diagram of an embodiment of the control client architecture.

The client system control webapp 224 is local to the control client 102. The architecture of the client system control webapp 224 is shown in FIG. 4, and it contains a plurality of different components that interact to provide a user of the control client 102 the ability to control devices, call-up scenes and presentations in a specific presentation environment 110. The client system control webapp 224 has multiple components to render the user interface on the control client 102. A custom skin 402 library provides visual coloring and effects to the baseline user interface control widgets that are defined by the device control user interface library, 404, and the extended device control user interface library 405. The user interface control and information widgets are used to populate the user interface framework 406 that defines the overall layout, navigation and control widget features. These interface widgets interface with the customized flash application 410, which extends the standard flash player 412, and other elements of the client system control webapp 224 to enable a user to receive feedback on system status from the server 100, and issue commands to the system. Sessions with the server 100 are handled by a server communication framework 416, while a flash remoting application 414 facilitates transferring flash content between the control client 102 and server 100.

User Interface

Figure 5:
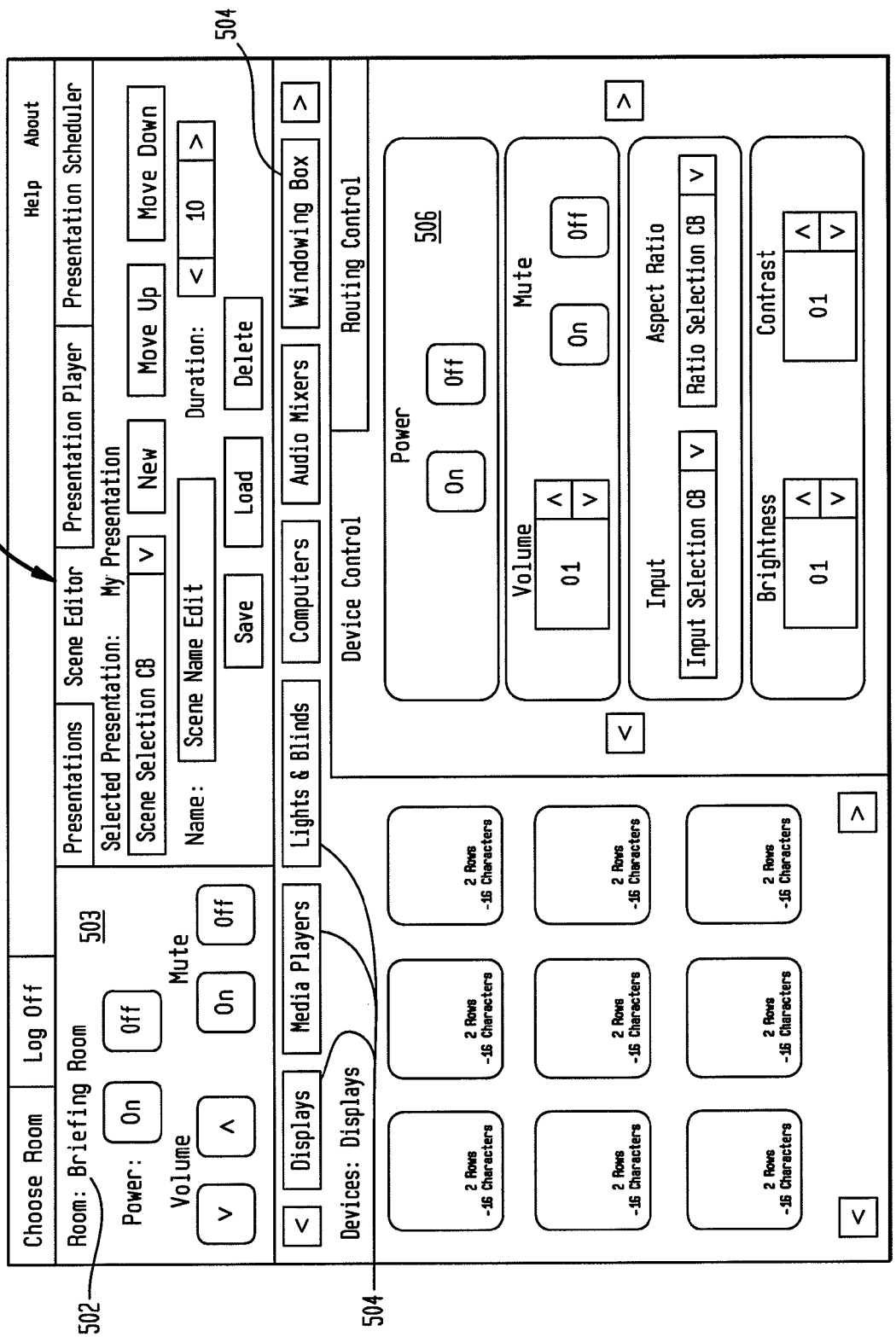
FIG. 5 is an embodiment of a first logical arrangement of a control client user interface for editing scenes.
Figure 6:
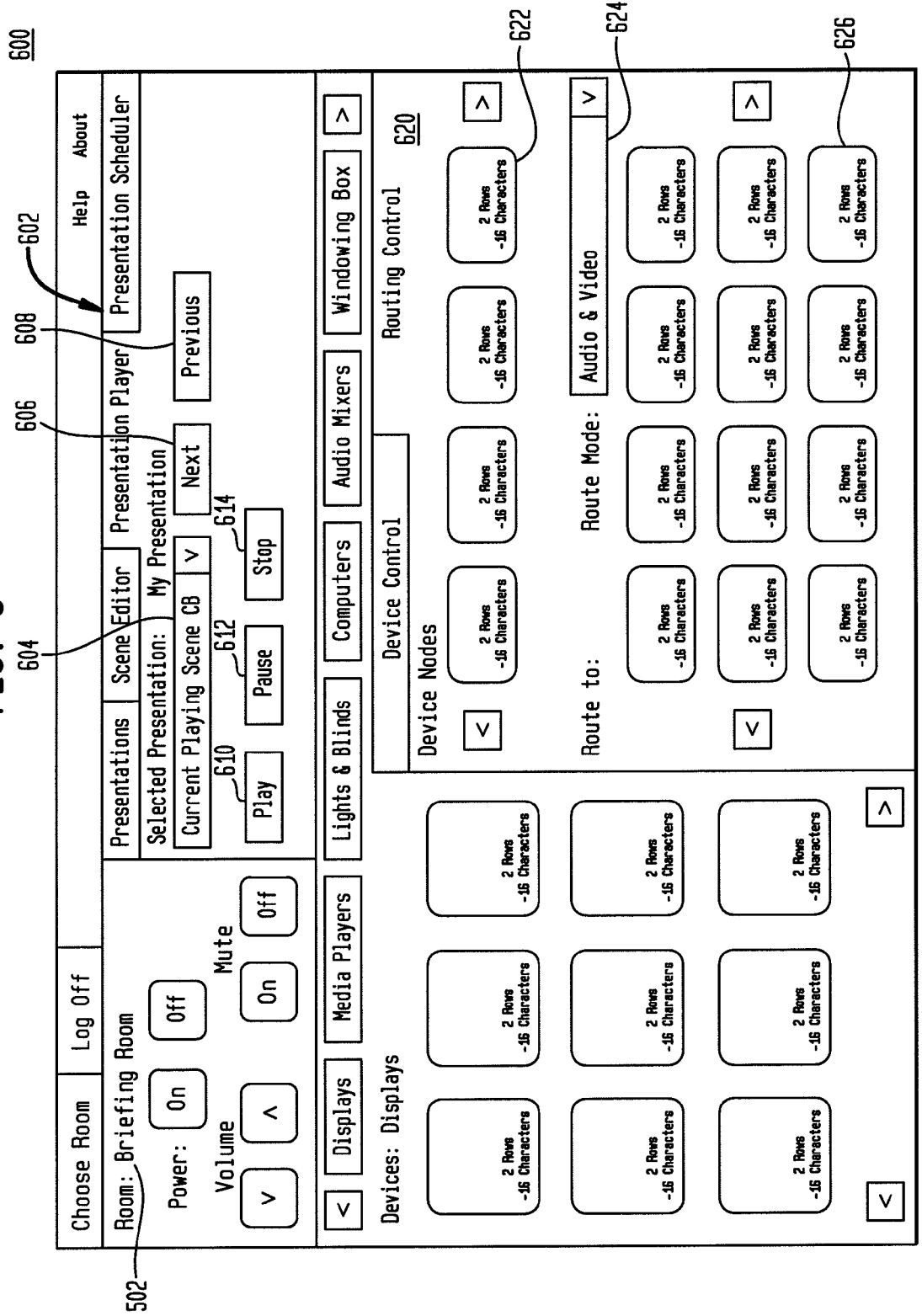
FIG. 6 is an embodiment of a second logical arrangement of a control client user interface for playing a predefined presentation.
Figure 7:
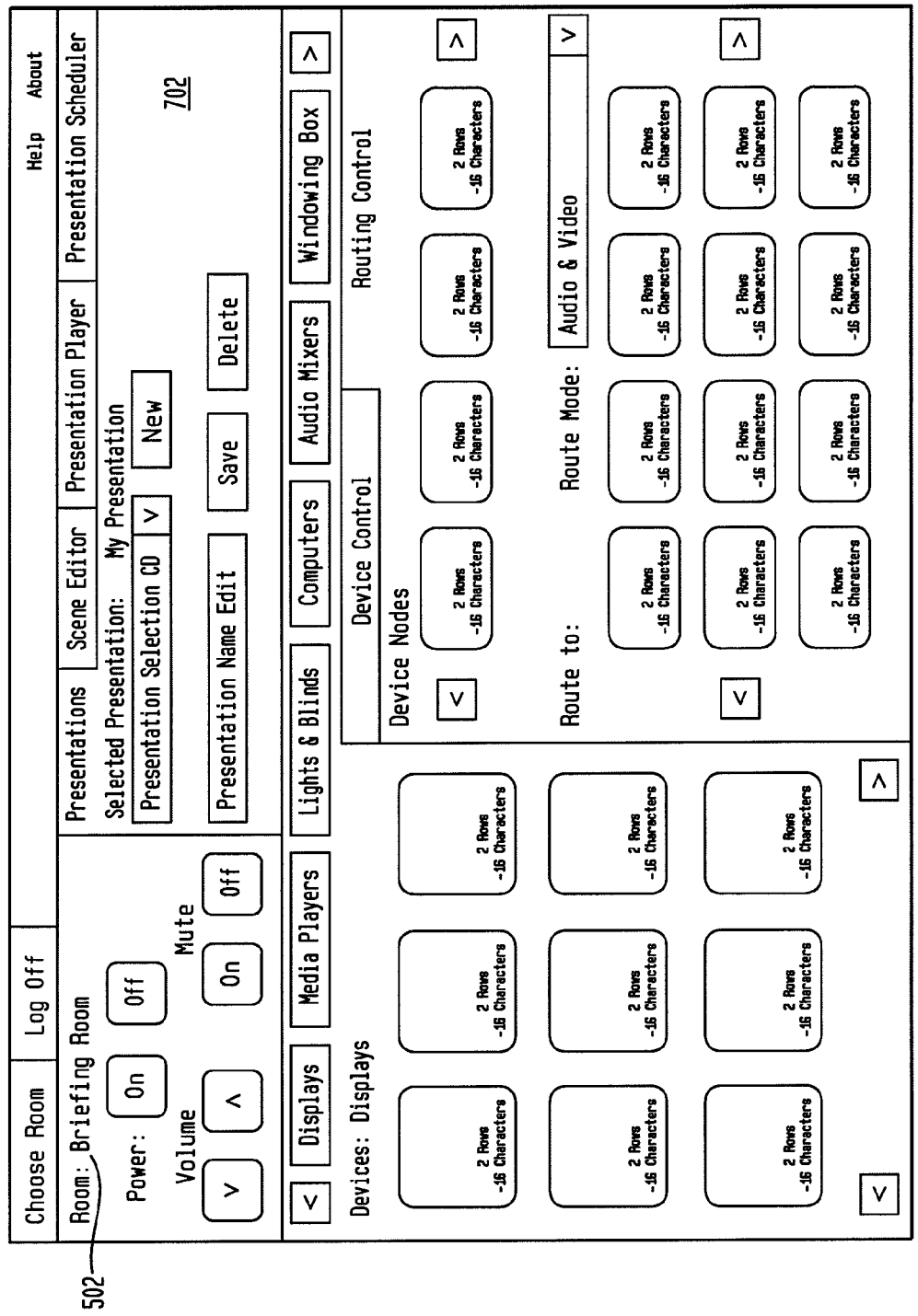
FIG. 7 is an embodiment of a third logical arrangement of a control client user interface for controlling a presentation.
Figure 8:
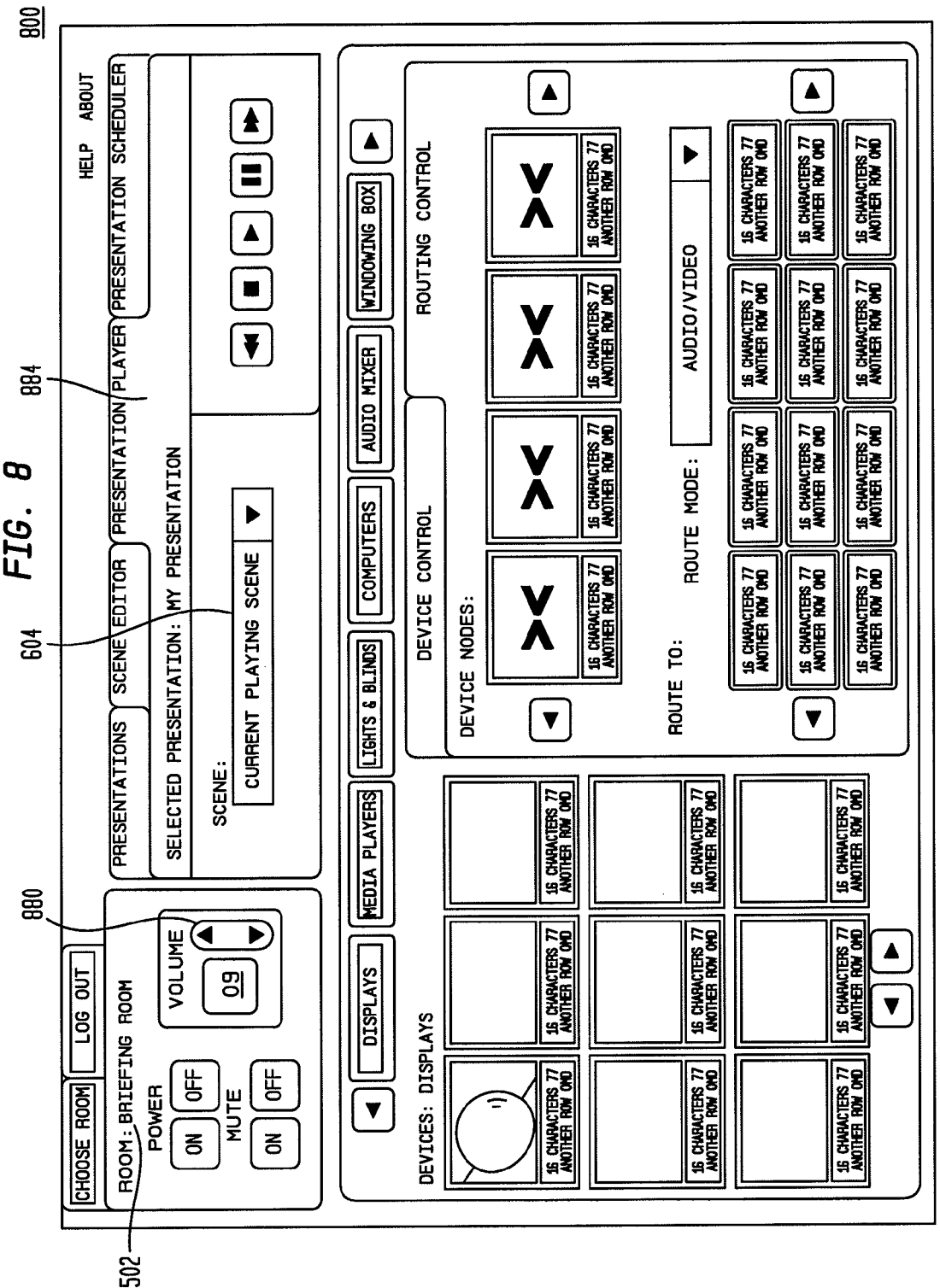
FIG. 8 is a rendered embodiment of a control client user interface showing the second logical arrangement.

Multiple examples of a user interface on a control client 102 are presented in schematic form in FIGS. 5-7 and a single rendered form in FIG. 8.

Scene Editor

FIG. 5 depicts a schematic view of an embodiment of the scene editor 500 interface where a user can define a specific scene for a specific room 502 by defining the state of devices 270, in this case the device under configuration 506 is a display. Based on the specific room 502 selected by the user, a different series of device selection buttons 504 are presented to the user. For example, if a specific room 502 within the presentation environment 110, does not include any audio mixers, then the device configuration tab for audio mixers would not be rendered on a user interface, in contrast the ability to configure that device 270 provided in the scene editor 500 interface embodiment shown.

Overall room controls 503 are also provided to the user so they can activate all of the systems in the room, e.g. power on and turn the volume up, down, or mute regardless of the specific devices being used. The overall room controls 503 provide a means for controlling all of the devices 270 associated with a given portion of the presentation environment 110 at the same time. This zone control allows the user to control the operations of multiple devices using a single control input. In the case of on/off controls the zone control effectively tells the server 100 to turn all of the devices 270 associated with that zone control to power up or down respectively. In the case of a graduated control, e.g. volume, the zone control provides a generalized user interface control to the user, such as a control numbered from 0 to 10. Then the zone control translates the user input on the zone control into the equivalent experienced by the device 270. For example, in one embodiment with two audio devices, one with a full scale volume input of 0-20 and the other with a full scale volume input of 0 to 100, the mapping from the single 0-10 input from the user into the others full scale range using a straightforward linear mapping. Other mapping functions can be created including logarithmic mappings or other customized mapping as required. These customized mapping functions, in some embodiments, are integrated into the device driver files and directly translate or map the user input to the device input when the configuration commands are issued to the device 270.

Presentation Player

FIG. 6 depicts a schematic view of an embodiment of the presentation control user interface 600. The presentation player 602 provides a user interface on the control client 102 that enables a user to select a specific presentation 604, skip either forward 606 or backward 608 from scene to scene, and play 610, pause 612 or stop 614 the presentation. The presentation control user interface 600 is showing the routing control user interface 620. The routing control user interface 620 allows a user to for a link or communication path for A/V data or signals by selecting a source device node button 622 to choose a specific a source device 120 and then selecting the type of signal to transfer using the signal routing type button 624 and selecting via the output device selection button 626 the destination or output device 130 for the A/V data. Once the user selects the type of source device 120, the signal routing type button 624 and the available output device buttons 626 change to reflect the type of signal produced by the selected source and the ability to route the signal to the output device 130 as well as the ability of the various accessible output devices 130 to accept that type of signal, which includes any converters 160 that are present in the presentation environment 110 to change the signal. The presentation control user interface 600 in some embodiments also restricts viewing of the different source devices 120 available to the user based on the type of output device 130 selected, for example when the user selects a specific projector 164, only source devices 120 capable of being routed to the selected project and capable of producing a signal usable by the projector 164 are displayed as being available for routing.

When defining these routes using the routing control 620, the user is presented with the devices 270 that are available to the user based on the presentation environment 110 or room 502 they are using, their rights, and any other environment information. In one embodiment, after selecting a specific source devices 130 by selecting a source device node button 622, the route mode 624 only presents route mode information that the source device 130 and the presentation environment 110 has been configured to accept or allow. In the embodiment displayed, the signal types capable of being routed from selected via the source device node button 622 is both audio and visual data as shown in the type of available routing mode 624 displayed in the routing control 620. In this embodiment, after selecting the routing mode 624, the devices 626 that information can be routed to, based on the configuration of the room 502 and the type of data to be routed, is presented to the user to enable them to complete the routing connection. In other embodiments, the presentation environment 110 may allow multiple routes to be formed, for example from a single laptop 150 video output selected as the selected device node 622 the signal can be routed to a splitter (not shown) that splits the signal into two discrete signals. Then output from the splitter can be routed to a first projector 164 and a second projector 164 placed in another portion of the room 502. In still other alternative embodiments the routing for different types of signals can be separated, meaning that the video output of a DVD player 154 is routed to a video device such as a monitor 162 while the audio output of the DVD player 154 is routed to the audio system 144.

Presentation Selection and Editing

FIG. 7 depicts a schematic view of an embodiment of a presentation definition control 700 user interface. The presentation definition control 700 user interface enables the user to select via the presentation selection interface 702 a specific presentation to access.

Rendered User Interface—Presentation Player

FIG. 8 depicts a rendered user interface 800 of the previously presented control user interface 600. Shown in FIG. 8 is a general volume control interface 880 that provides a zone control interface for all devices in the selected room 502 of the presentation environment 110. The presentation control user interface 600 highlights the name of the selected presentation 884 and details which scene within the presentation is currently playing via the scene selector drop down 886. The scene selector drop down 886 in this embodiment allows a user to quickly shift between different scenes within the sequence of scenes found within a presentation.

Exemplary Control for Devices

The following examples detail some exemplary commands and attributes for a given device 270 to be controlled by the system and stored within the device configuration 908 located within the database 202. These command and information definitions are not intended to provide exemplary instruction to one of ordinary skill in the art necessary for one to adapt this information to other systems and provide insight into how commands and user interface widgets can be abstracted from the details of the devices 270 being controlled. The following styles are used to define the device commands and attributes provided below:

name=Attribute command
    (D)=Device command
    (ROA)=Read only attribute

Group/Room Control

These are commands and attributes that are issued to a group of rooms, or a single room, effectively as a whole. For example, if there are multiple environmental devices 142, such as light controls in a given room, the lights 260 up or down command would be issued to all of the light control devices in the room. Similarly if there are other environmental devices 142 in the form of controllable shades 266 in the room 502, the group or room control can be configured such that lowering the lights 260 in the room also draws the shades 266 to darken the room. Or alternatively if there are multiple audio sources, then a mute command would be issued to all of the audio devices 258 in the room.

power=[true, false]
    (D) volumeUp
    (D) volumeDown
    mute=[true, false]
    (D) lightsup
    (D) lightsDown Power Power is a command that enables the system to power an individual device 270 on or off. The power command can be issued either directly to the device 270 or alternatively can be directed to a controllable power supply or distribution channel.

power=[true, false]

Shades 266

Shades 266 represents a type of environmental control 142 that controls window coverings.

(D) Open
    (D) Close
    status=[% open]

Media Player 268

A media player 268 is an arbitrary type of generalized A/V signal source or source device 120 that plays different types of media, including tape.

playStatus=[play, stop, pause]
    (D) fastForward
    (D) rewind

DVD Player 154

A DVD (Digital Versatile Disk) Player 154 a type of source device 120 adapted to play DVD discs and in some embodiments compact audio discs.

title=[numeric value of title]
    chapter=[numeric value of chapter]
    (ROA) numberOfTitles=contains total number of titles on disc
    (ROA) numberOfChapters=contains total number of chapters on current title
    (D) nextChapter
    (D) previousChapter
    (D) menu
    (D) cursorUp
    (D) cursorDown
    (D) cursorLeft
    (D) cursorRight
    (D) select Display 162

Representing a general purpose output device 130 such as a television or monitor.

aspectRatio=[standard, widescreen, zoom]

Audio 258

An audio output device 130.

mute=[true, false]
    volume=[numeric value of volume]

Windowing Box (RGB Spectrum)

The windowing box is controlling an RGB rendering tool, such as the Video to RGB converter 160 shown in FIG. 1.

(D) zoomIn1, zoomIn2 . . . (as many as there are windows, inputs)
    (D) zoomOut1, zoomOut2 . . . (as many as there are windows, inputs)
    (D) up1, up2 . . . (as many as there are windows, inputs)
    (D) down1, down2 . . . (as many as there are windows, inputs)
    (D) left1, left2 . . . (as many as there are windows, inputs)
    (D) right1, right2 . . . (as many as there are windows, inputs)
    preset=[(enum) either numbers or text labels]
    label1, label2 (as many as there are windows)=[text field]

Lighting 260

Lighting 260 represents a type of environmental device 142 or detached device present in the presentation environment 110 that effects the environment, but is detached from the signal flow established between source devices 120 and output devices 130 via any control devices 140.

(D) lightsup
    (D) lightsDown

Single Zone Control

A zone is a logical grouping of nodes, elements or devices and can be large or small in number. A zone can encompass a number of presentation environments 110 or rooms 502, a set of devices 270 within a room 502, or even a number of nodes within a single device 270.

(D) rampup
    (D) rampDown
    (D) stopRamp
    intensity=[numeric value of intensity (1-100)]
    power=[true, false]

Multizone Control

A multizone control is one that controls many zones per control unit, effectively aggregating multiple zones into a single user interface.

(D) rampUp1, rampUp2 (as many as there are zones)
    (D) rampDown1, rampDown2 (as many as there are zones)
    (D) stopRamp (will stop ramping of all zones)
    intensity1, intensity2=[numeric value of intensity (1-100)] (as many attributes as there are zones)
    preset=[numeric value of preset]
    power=[true, false] (basically ramps all to max or all to 0)
    (ROA) numberOfZones=number of zones on the configured control unit Master Control Unit Control The master unit control provides a control suitable for all devices 270 or substantially all devices 270 present in a presentation environment 110 enabling commands to be issued to all devices 270 associated with the presentation environment 110.

(D) rampup
    (D) rampDown
    (D) stopRamp
    preset=[numeric value of preset (1-16)]

Other devices depicted in FIG. 2 as being controlled include video conferencing systems 262 that link multiple conference rooms together, a camera 264 for live viewing or contemporaneous recording of the room, and a Keyboard, Video, Mouse (KVM) switch 250 that can be enabled to provide a system administrator or presenter access to input devices located within a given presentation environment 110 such as a keyboard or mouse.

The total number and types of devices 270 present in a given presentation environment 110 can vary significantly with a variety of different mixtures of source devices 120, output devices 130, switches or control devices 140 and detached devices or environment devices 142, including environmental sensors and actuators available for configuration, query, command and control. In the case of environment devices 142 that provide environmental information, such as ambient temperature sensors, humidity sensors, ambient light sensors, discrete input devices such as switches, and room occupancy sensors the server 100 maintains drivers capable of monitoring the information provided by these environment device 142 sensors and capturing specific events generated by these sensors for response by the system.

Scalable End User Licensing

One aspect of one embodiment of the system and method for audio visual control and integration is the ability for the system to scale from a small installation to larger installations. The basic licensing structure is based a base fee that includes a fixed number of servers 100, logical rooms 502, and devices 270 present within a presentation environment 110. The fixed numbers are adjustable to and in addition to the total numbers of devices 270 present the licensing and in some embodiments is keyed to the total number of specific types of devices 270, such as a total number of source devices 120, or switches/control devices 140. Additional fees are charged based on the additional rooms 502, the number of devices 270 per a room 502, and additional modules. All drivers for audio-visual hardware located in the presentation environment 110 are provided to the purchaser for a fixed period of time. After the initial period, the access to additional drivers to support the addition or substitute of other types of audio-visual hardware located in the presentation environment 110 are made available on a pay-per-installation basis or through a maintenance program.

Mechanism for Achieving End User Licensing

In one embodiment of the licensing system, there are two processes for allowing a given user system to access or change additional licenses or features: generating private and public keystores to enable asymmetric key encryption and then generating an actual license. The generation of keystores only needs to occur once while generating the license occurs many times, possibly for every customer.

Generating License Key Stores

In this one embodiment, private and public keystores are created as part of a given distribution of an embodiment of the system and method for audio visual control and integration. The keystores create both private key and public certificate files. The private key is held by the company distributing the embodiment of the system. The public certificates are used by third parties, nominally purchasers of an embodiment of the system and method for controlling, routing and managing data, who are communicating with the company to obtain additional licenses to expand, extend, or access the capabilities of the system.

Generating a License File

During installation of this one embodiment of the system, a license for the software is generated. When an upgrade to the capabilities of a given installation is desired, the user communicates with the company to obtain a new license. The new license enables the user to unlock the additional capabilities of the system. The license is encrypted using the private keys held by the company, and decrypted using the public keys held by the user to provide access to the additional capabilities. In this manner, it is possible for a user to upgrade the capabilities of an embodiment of the present system and method in a transparent manner.

Driver Specific Licensing

In addition to controlling the total quantities of devices 270, rooms 502, or servers 100 supported by a given installation, the system also enables in some embodiments the control of individual device drivers via the same licensing system. In these embodiments the same process described above for generating and encrypting the license file necessary to enable the system to operate a different levels or install additional components is used to control the distribution of specific driver files. There are two specific embodiments for protecting the driver files in this embodiment of the system and method. In the first embodiment the driver files are either transferred unencrypted from a driver server to the server 100 along with a license key adapted specifically to the driver file. The license key is unencrypted and installed in the server 100 to enable the server 100 to access and install the driver file. Without the installed key, the server 100 is unable to access and install the driver file into the device control library 340 for use by the server 100. In the second embodiment the driver files themselves are encrypted by the driver server using the driver server private key. The server 100 then decrypts the file locally using a key transferred to the server 100 to install and access the driver file into the device control library 340 for use by the server 100. In both of these embodiments, the system provides for controlled distribution of specific drivers to servers 100, these controlled distribution of specific drivers can be integrated together with the other licensing schemes described herein and known to those of ordinary skill in the art.

Administration and Access Control

The server 100 in one embodiment includes a three tier access control system. In the first level of access control, the system configuration controls are dedicated to those with administrative rights only and enables administrators to view and edit access control to presentations and rooms. The system configuration controls are used to control the access levels available to users, and thereby limit selections to improve usability and reduce the potential for error.

The second level of access control is room-based access control. Administrators grant access to users based on who the user is or what role, or task, the user is performing. The room-based access control limits the number of rooms that a user can access by limiting the rooms visible to the user. At the room level, Administrators may specify a non-deletable main presentation that provides default settings for all presentations run in a specific room. For example, the main presentation for a given room may link multiple projectors 164 together to display the same video routed through a switch 170 from a given presentation laptop 150 input, while simultaneously setting audio 258 levels in the room and dimming the lights 260.

The third level of access control in this one embodiment is presentation level access control. There are three fundamental logical access levels to presentations: none, meaning the presentation is inaccessible to a given user; read-only, meaning the presentation can be viewed or used by a given user, but cannot be modified by that user; and, full, enabling the user to modify and control the presentation in any way they wish, limited only by room-based access control prohibitions. Advanced users are able to create presentations and specify access to or share presentations with other users including the ability to provide full, or limited access to the presentations.

Administrators have access to all presentations regardless of access level specified by advanced users.

In still another embodiment, to seed or initialize access control levels for given users, the system communicates with an external name or user server to obtain default attributes for a given user. For example, in one embodiment, the server 100 communicates with an external name server such as a Microsoft® Exchange® server via a communication interface, such as the Lightweight Directory Access Protocol (LDAP). The server 100 retrieves base user details and attributes from the external name server via LDAP thereby allowing integration of the system with an overall enterprise architecture. Thus, the server 100 is able to update specific user customization features, such as full name, default security and access levels for the user by accessing enterprise resources, thereby simplifying maintenance of the system and providing uniformity and integration with enterprise wide information technology infrastructure.

Scene Control

The control client 102, in one embodiment, has the ability to edit the fine details of all devices associated with a specific scene. The control client 102, presents the user with a listing of all possible devices 270 that can be saved in a particular scene. The user can select specific devices 270, and the server 100 will save the state of the device 270 corresponding to the operation of that device 270 in the specified scene, such as volume levels for an audio device 258, along with the details of the scene. In addition to saving specific device states, the user can also retain specific routing information between devices 270 associated with a specific scene. The data corresponding to specific device 270 states and routing information is stored as application data 204 in the database 202. In this manner the user, through the control client 102, can rapidly save and restore specific routing and device configuration for reuse at a later time.

Fine Grained Scene Control

When specifying a scene, the user can also define events, such as when a specific action will occur, or how long a given scene is active. In this manner, the user can string multiple scenes together to form a presentation. For example in a simple case, a first scene can be used to create an opening, pre-presentation lighting and presentation environment where ambient music is piped into the room from a media player 268 and sent to an audio device 258, but there is no connection between an presentation laptop 150 and the main projector 164 enabling the presenter to ready materials and allow the audience to enter the room unhindered. When the presentation is ready to begin, a second scene is activated where the lights 260 are lowered to enhance visibility, window shades 266 are drawn, and the laptop 150 video output is connected to the projector 164 and the media player 268 is stopped.

Using fine-grained scene control, a user is able to adapt a specific scene definition to only effect a subset of devices 270 located in a specific performance environment 110 necessary to change state or adopt specific setting necessary to implement the scene relative to the prior scene. In this manner, when multiple scenes are activated sequentially, for example during a presentation, or by user command, the only actions and commands sent to the devices 270 by the server 100 are those necessary to change the state of the devices 270 and the configuration of the presentation environment 110 to achieve the desired new scene configuration. Thus all other device 270 configurations and settings remaining from a prior scene that are unchanged in the new scene can be left constant. For example, at the end of a presentation a scene could be created for a question and answer period, whereby the only change from the presentation scene configuration to the question and answer configuration is to have the lights 260 raised to a desired intensity level to enable the presenter to view the audience asking questions. Using fine-grained scene control, the question and answer scene following a presentation scene would only address a single set of devices 270, namely lights 260 and all other parameters would be left unchanged from the prior scene.

Fine grained scene control enables the system to transition smoothly from scene to scene. For example, if a presentation requires first lowering the light 260 and playing an introductory clip from a DVD player 154 on the projector 164 in a first scene, and then proceeding to a user presentation from a laptop 150 using the same resolution on the projector 164 with the lights 260 at the same reduced level in the next scene, then the only change to any devices 270 necessary for that scene-to-scene transition would be to change the A/V source routing to the projector 164 from the DVD player 154 to the laptop 150. The lights 260 and projector 164 would not have to be reconfigured. If the lights 260 were reset back to full on or full off before being set again to the reduced level, or the projector 164 reset, viewers could perceive a momentary flicker. Similarly, unnecessary switching or resetting of A/V sources could cause unnecessary audible clicks or pops. Therefore, only changes that represent the differences from one scene to the next scene are made thus smoothing transitions.

In one embodiment, transitions from one scene to another scene in a presentation are user driven. In another embodiment, the transitions are handled by an event engine in the server 100. The event engine has an event response handler that identifies events and then switches scenes or modifies the presentation environment based on the event. For example, the event engine may wait for a user prompt before transitioning from a first scene to a second scene. Additionally, the event handler could automatically trigger the configuring of a number of presentation environments 110 at a specific time, for example to prepare a number of rooms 502 in different cities for a multi-party conference call. The event engine can also accept events triggered outside the server 100, for example a remote service call placed over a network 118 to remotely test a presentation environment 110 by a system administrator or service provider.

Event Engine

A component of the application service 306 is an event engine. The event engine comprises three principle components, event generators, an event monitor, and an event handler. These three components work in concert to identify specific occurrences in the environment or the system, including user inputs, and respond to those occurrences. The event engine enables the system to adapt to changes in or inputs from the environment, including the failure of specific components or devices 270.

The system possesses event generators that generate internal events for the system based on specific requirements or desired occurrences. The event generators can reside and generate events from any internal service or sub-routine. Some examples of events include timers, alarms, other alerts that are generated during startup, configuration and implementation of the system and specific scenes, alerts that are triggered upon occurrence of a specific event such as a sensor exceeding a specified threshold value or another triggers that occur during operation. These internal events are passed to the event monitor for identification, recording and classification.

The event monitor supervises the overall system to identify, record and classify the occurrence of specific events.

These events are sequentially recorded as they emerge or are generated from the system during operation. Some events captured by the event monitor include internal events generated by the event generator, failures, errors or reporting messages received from devices 270, inputs from environmental devices, other communications and user interface inputs. The event monitor thus captures specific events occurring on the system regardless of where they are generated and passes the events to the event handler for disposition. The event monitor thus logs and in some embodiments optionally maintains a record of specific events experienced by the system during operation.

The event handler processes or handles a given event that has been captured by the event monitor. The event handler determines the type of event that has occurred, determines whether it falls into a specific class of events that has a pre-defined response or if there is a unique response specific to the type of event and then triggers the appropriate sub-functions or routines necessary to respond to the event. In some circumstances the responses to given events is to change a scene as described above, other responses include notifying the user, logging the event, or performing other functions. In this manner, the event engine enables the system is able to dynamically respond to multiple occurrences or triggers found in the system and the environment.

IP Phone Connectivity

In one embodiment of the system and method for audio visual control and integration, there is a connection from the server to an internet protocol, or IP phone 210, also referred to as a Voice over IP (VoIP) Phone 210. The VoIP phone 210 is connected to either or both an internal and external network that can transmit voice communications and in some cases can also transmit video streams and other data. The interface to the IP Phone 210 is provided by the IP Phone Interface Component 212 that implements a logical interface with IP phones 210. The IP Phone Interface Component 212 implements an XML based schema for interfacing with a given make and model IP Phone 210, including routing information and feedback from the phone into the application service 306 as well as providing commands to the IP phone 210 itself.

The flexibility of the IP Phone Interface Component 212 is the ability for the phone interface to be customized by the type of hardware being interfaced and even the room being used. For example, in one embodiment, an IP Phone manufacturer using the standards defined above, can create a highly customized, rich user interface that is presented to a person using a control client 102 that enables that person to effectively control the features and capabilities of that particular manufacturers IP Phone 210. Similarly, an administrator can control access to the features and capabilities of a given IP Phone 210 in order to achieve specific goals. For example, an administrator may restrict outgoing calls from an IP Phone 210 connected to a secure conference room to only other internal phones in order to limit potential disclosure of information.

Second Exemplary Environment

Figure 10:
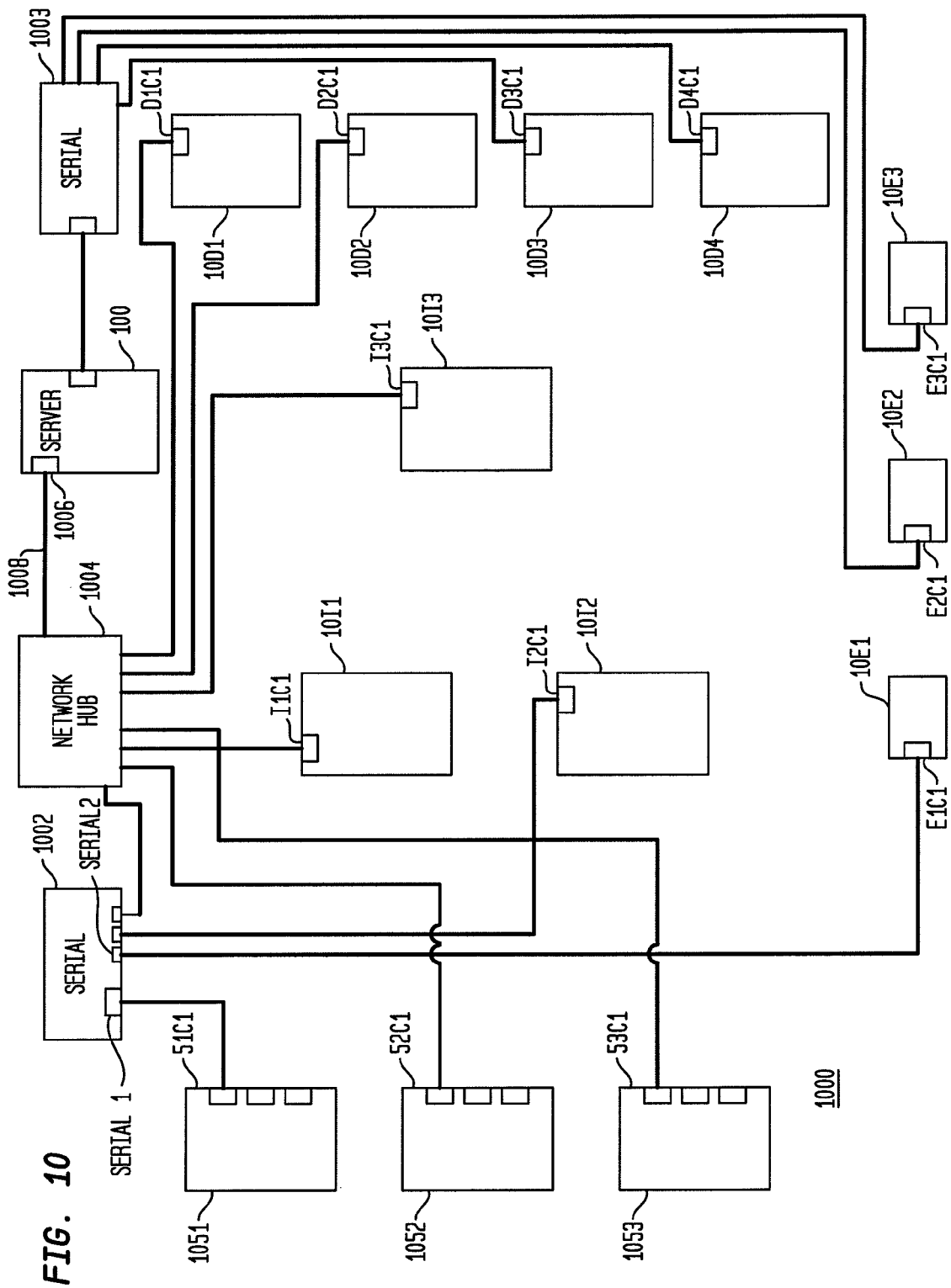
FIG. 10 is a depiction of a control or command level diagram of a second exemplary environment.
Figure 11:
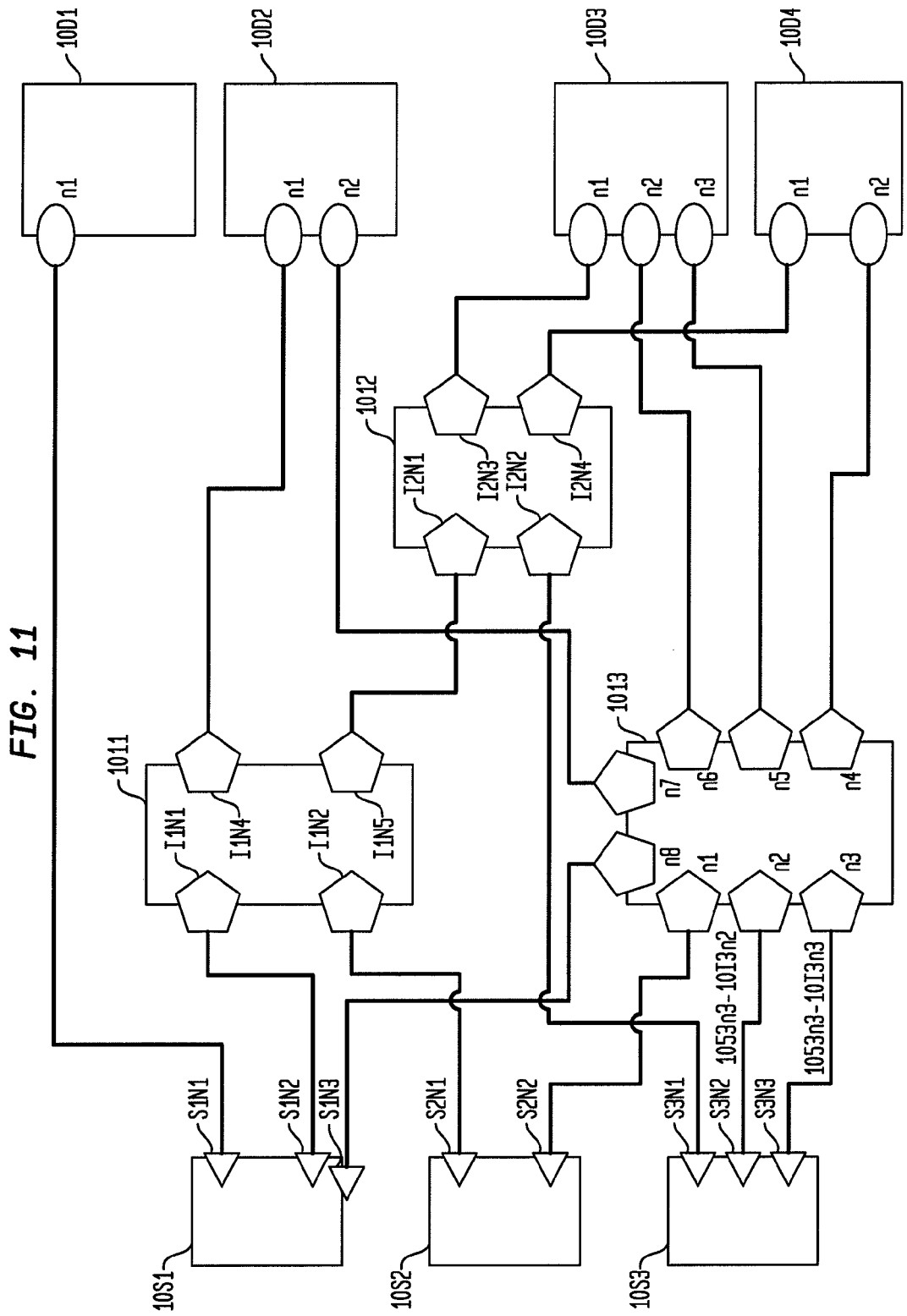
FIG. 11 is a depiction of a signal level diagram of the second exemplary environment shown in FIG. 10.

FIGS. 10 and 11 depict a second exemplary environment 1000 with multiple sources, outputs, switches, and detached devices. For the purposes of FIGS. 10 and 11 only, the following naming conventions is used for the figures whereby all devices and their associated interface nodes or ports are described using the key [10a#n#] where a represents the type of device 270 (s=source, o=output, i=switch or interface or flow control, and e=environment device or controls), followed by a unique number whereby s1 refers to the first source device 120. The finally two letters and number indicate whether the node is a communication node "c" or an interface node "n" followed by a unique number identifying the that node for the given device. The sources are referred to collectively as sources 10s, outputs are collectively referred to as outputs 10o, switches are collectively referred to as switches 10i, and detached device or environmental controls as controls 10e.

FIG. 10 depicts a command level view of the second exemplary environment 1000 that details the command interface connections between the server 100 and the other devices 270, such as the sources 10S1-10S3, outputs 10o1-10o4, switches 10i1-10i3, and environmental controls 10e1-10e3 located within the exemplary environment 1000.

FIG. 11 depicts a signal level diagram of the second exemplary environment 1000 details the physical interface between the signal ports or nodes of the sources, outputs and switches located within the exemplary environment 1000. Table I provide details of the various sources, outputs, switches and device controls in the second exemplary environment while Table II provides exemplary devices including the respective sources, outputs, switches, and device controls represent in two different applications.

TABLE I

Table of Sources 120, Outputs 130, Switches and Control Devices 140 Including Associated Nodes Depicted in the Second Exemplary Environment:

| Device Name | Device ID | Associated Communication node ID | Associated Interface Node ID |
|---|---|---|---|
| Source Device #1 | 10s1 | s1c1 | s1n1 |
|  |  |  | s1n2 |
|  |  |  | s1n3 |
| Source Device #2 | 10s2 | s2c1 | s2n1 |
|  |  |  | s2n2 |
| Source Device #3 | 10s3 | s3c1 | s3n1 |
|  |  |  | s3n2 |
|  |  |  | s3n3 |
| Interface Device #1 | 10I1 | I1c1 | I1n1 |
|  |  |  | I1n2 |
|  |  |  | I1n3 |
|  |  |  | I1n4 |
| Interface Device #2 | 10I2 | I2c1 | I2n1 |
|  |  |  | I2n2 |
|  |  |  | I2n3 |
|  |  |  | I2n4 |
| Interface Device #3 | 10I3 | I3c1 | I3n1 |
|  |  |  | I3n2 |
|  |  |  | I3n3 |
|  |  |  | I3n4 |
|  |  |  | I3n5 |
|  |  |  | I3n6 |
|  |  |  | I3n7 |
|  |  |  | I3n8 |
| Output Device #1 | 10D1 | d1c1 | d1n1 |
| Output Device #2 | 10D2 | d2c1 | d2n1 |
|  |  |  | d2n2 |
| Output Device #3 | 10D3 | d3c1 | d3n1 |
|  |  |  | d3n2 |
|  |  |  | d3n3 |
| Output Device #4 | 10D4 | d4c1 | d4n1 |
|  |  |  | d4n1 |
| Environment Device #1 | 10e1 | e1c1 | — |
| Environment Device #2 | 10e2 | e2c1 | — |
| Environment Device #3 | 10e3 | e3c1 | — |

TABLE II

Exemplary Devices For Audio Visual Applications or Building Systems Corresponding to the Respective Sources 120, Outputs 130, Switches and Control Devices 140 Shown in the Second Exemplary Environment:

| Device Name | Device ID | Exemplary Audio Visual Devices | Exemplary Building Systems Devices |
|---|---|---|---|
| Source Device #1 | 10s1 | DVD Player 154 | Chilled Water Supply |
| Source Device #2 | 10s2 | Satellite Receiver 182 | Fresh Air Supply |
| Source Device #3 | 10s3 | Computer 150 | Conditioned Air Supply |
| Interface Device #1 | 10I1 | Switch 170 | Heat Exchanger |
| Interface Device #2 | 10I2 | Switch 170 | Mixer #1 |
| Interface Device #3 | 10I3 | Switch 170 | Mixer #2 |
| Output Device #1 | 10D1 | Audio Amplifier 258 | Water Supply |
| Output Device #2 | 10D2 | Monitor 162 | Room Vent #1 |
| Output Device #3 | 10D3 | Projector 164 | Room Vent #2 |
| Output Device #4 | 10D4 | Projector 164 | Room Vent #3 |
| Environment Device #1 | 10e1 | Light Control 260 | Light Control |
| Environment Device #2 | 10e2 | Window Shade Control 266 | Thermostat |
| Environment Device #3 | 10e3 | Ambient Light Sensor | Humidity Sensor |

Installer

One embodiment of the installation system for the system and method for audio visual control and integration provides a system to enable an end user to rapidly install all of the required elements of the system for a given user installation in one single pass. The installer installs all components of the system, including, but not limited to the control language, the application server 100, and the database 202. As part of the installation sequence, the installer will configure the system to support specified hardware devices 270.

Part of the installer system includes a tool or wizard interface for gathering information from the user about the presentation environment 110 to be controlled, namely providing a guided means for configuring the server 100 for the given presentation environment. In an exemplary installation, the user would define the physical rooms 502, or zones to be controlled. The user would provide the server 100 with information regarding the devices 270 available to be controlled within the room. Each device 270, can have a customized device control 506 interface for that particular type of device provided by the device driver or have a generic device control 506 interface suited for that specific type of device 270. For example, a customized device control 506 interface may be configured with specific commands to activate features of a projector 164 such as resealing, color, or brightness while a generic device control 506 interface for a light 260 simply signals a control line to switch state and turn the light on or off. Then the user configures the static connections within the presentation environment 110. The static connections define all of the connections between devices 270 that are potentially available to be controlled. Additional details on the specific configuration process to adapt and model a given presentation environment 110 or the second exemplary environment 1000 is provided below.

Configuring the System

The initial configuration of an arbitrary environment, such as the second exemplary environment 1000 depicted in FIGS. 10 and 11, is initiated by the installation of any or all of the devices and static connections or additions to or deletions from the devices and static connections present within the second exemplary environment 1000. The configuration of the system to control the devices present within the second exemplary environment 1000 is accomplished via either a manual configuration process or automated configuration process as described below.

Manual Configuration Process

Figure 12:
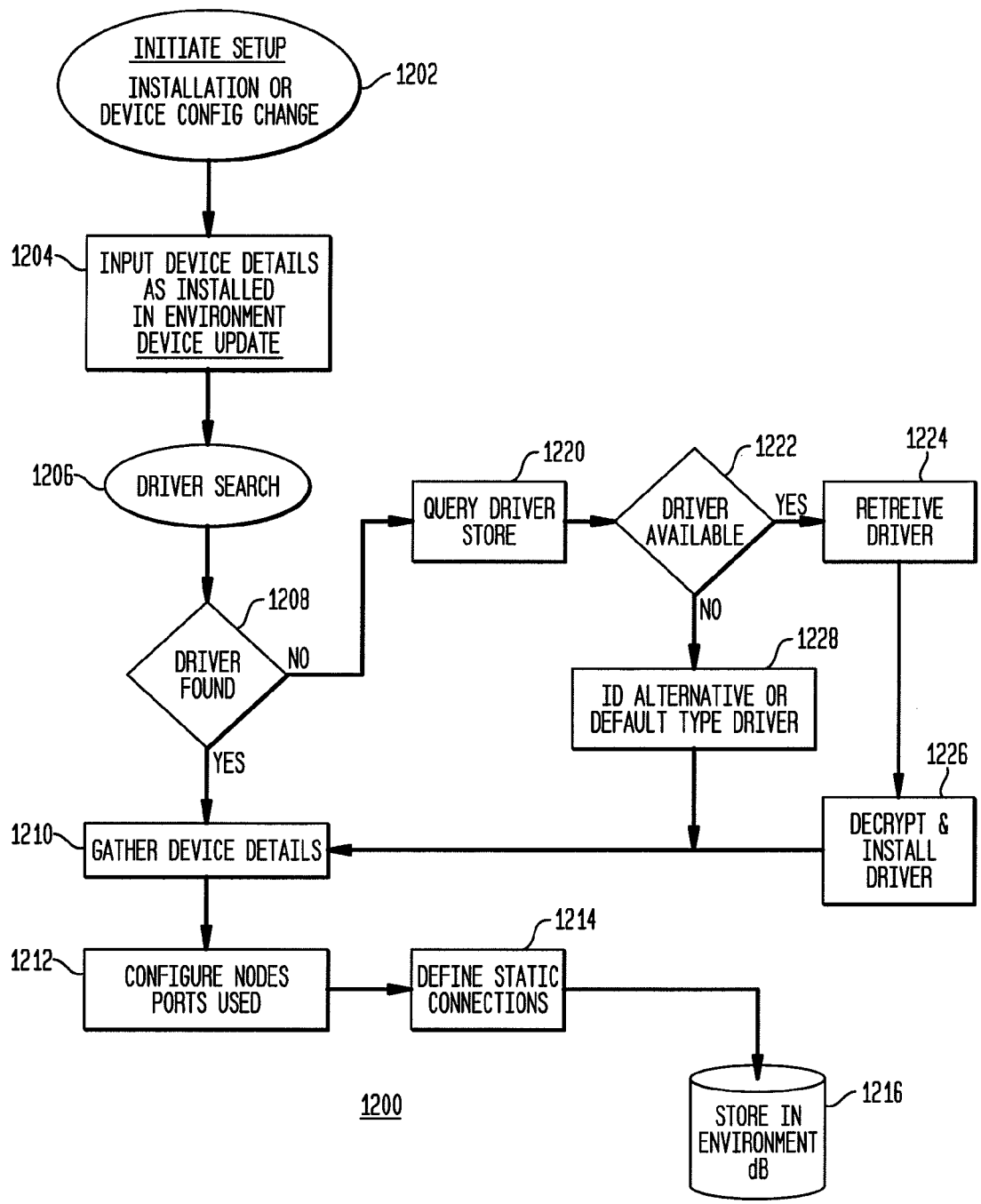
FIG. 12 is a flow diagram detailing the configuration process for the system upon installation of devices in the environment or other additions of equipment to the environment.

The manual configuration process 1200 for the system is detailed in FIG. 12a. The manual configuration process 1200 is initiated 1202 upon either the initial installation and setup of the second exemplary environment 1000 or upon the addition or deletion of one or more a new devices or static connections between devices to the second exemplary environment 1000. For example, the manual configuration process 1200 in one case is initiated by the addition of a third source device 10s3 to the second exemplary environment 1000 and the connection of the second node of the third source device 10s3|n2 to the first node of the second interface switch 10i2|n1 thereby creating an 10s3→10i2 static connection or link between the respective nodes.

For the manual configuration process 1200, the system is updated directly by manual input. In this case first the third source device 10s3 is added to the definition or representation of the second exemplary environment 1000 stored in the database 202. A device update 1204 is performed to define the devices 270 present in the environment that are part of the system, for example the device update 1204 in the case of the addition of the third source device 10s3 to the second exemplary environment 1000 would provide basic details on the third source device 10s3, such as the type, make, manufacturer, model number and other details.

In yet another embodiment, where the third source device 10s3 is capable of announcing its presence in the second exemplary environment 1000 after being powered up or during initial configuration using either a standard plug-n-play or other announcement process the system receives the announcement over the server communication port 1006 that interfaces via a server communication link 1008 the system to the second exemplary environment, in some cases this communication port or communication node associated with the server 1006 is used as the server's 100 second interface to the command level network of the second exemplary environment 1000. The announcement is the equivalent of starting or initiating the device update 1204 process manually, except the update process is triggered by the announcement generated by the third source device 10s3. The server 100 receives the announcement from the new device added to the second exemplary environment 1000. The announcement generates an event that is captured by the event monitor on the application service 306. The event handler portion of the application service 306 then initiates 1202 the setup process and starts the input of device details using information provided by the third source device 10s3 as part of its announcement process.

After the device update 1204 is started the newly added device, in this case the third source device 10s3, must be configured. First the server 100 performs a driver search 1206 to determine whether there exists in the system a driver definition, driver interface definition, or simply driver file appropriate for the type of installed device in the system's driver library. If the driver search locates or identifies 1208 a driver for the device to be installed, then the next step in the process is to prompt the user to gather 1210 any optional or additional device details on the installed device. Some additional details input by the user may include specific details of the installation environment, easy to remember names for the devices (e.g. Conf. Room #2 Projector) and other details as prompted by either the system itself or the device driver.

If no driver definition file exists on the server 100, the system queries 1220 a driver store or remote server with multiple drivers available under a variety of different terms and conditions. The driver store in one embodiment is accessible via a wide area network such as the Internet. If a driver is available 1222, then the driver store retrieval process 1224 begins to retrieve the appropriate or requested driver for transfer to the server 100. In one embodiment the driver store retrieval process 1224 includes either encrypting the entire driver file using an asymmetric key accessible on the driver store or alternatively encrypting a token or license key to be used by the server 100 to unlock or access the driver file after download. The driver file is transferred to the server 100, and the server 100 unlocks or decrypts and installs 1226 the driver file into local driver definition file storage on the server 100. After completing the driver retrieval process 1224 and decryption and installation process 1226, the process returns to gather 1210 the device details. In another embodiment, the user manually queries a driver store and manually identifies and downloads a driver file that is provided to the system for installation directly by the user.

If the driver store does not have a driver available 1222 for the device to be installed, such as the third source device 10s3, then the driver store will attempt to identify an alternative driver 1228 or default driver to use with the device to be installed. For example, in the case where the third source device 10s3 is a DVD player 154, if the driver availability 1222 shows no drive file specifically suited for the specific type of DVD player 154 to be installed in the system, then a search is conducted to identify an alternative driver 1228 to be used. In the case of the DVD player 154, a default driver might be a generalized DVD player driver that simply powers up the DVD player 154 without any additional command inputs to the third source device 10s3 command port s3c1. In some circumstances the command port, such as s3c1 does not directly command the third source device 10s3 direct, rather it simply controls a remote control switch that selectively activates or powers up the selected device. After identifying an alternative driver 1228 to be used the user is then prompted to gather 1210 device details. In the case of a generalized or generic device driver file additional information collected during the gather 1210 process in some embodiments can include specific command strings that can be issued by the server 100 in order to access specific functionality of the device to be installed, or in the embodiment depicted the third source device 10s3.

The process for configuring an embodiment of the system to control an arbitrary environment begins by defining and configuring the nodes 1212 associated with or integral to specific devices 270 in the environment and establishing the static connections or links between the devices 270. In the case of the second exemplary environment 1000 each of the devices 270 located or associated with the environment, regardless whether or not the devices 270 are physically connected to the environment or only connected to the environment via a communication or other link posses at least one node, a communication node, or communication port, or command port. One sub-step of configuring the nodes 1212 or ports used by an arbitrary device 270 is to define the communications used by the system to communicate and address the device 270. In the second exemplary environment, a communication node exists for the third source device 10s3, namely the third source device 10s3 communication node s3c1. In this embodiment the third source device 10s3 communication node s3c1 is connected to a network hub 1004, this enables the server 100 to directly communicate with the third source device 10s3 via the network. The process of configuring the nodes 1212 for the third source device 10s3 communication node s3c1 in one embodiment includes defining a specific internet protocol address or network device ID for the third source device 10s3 that enables the server 100 to communicate commands and receive information from the third source device 10s3.

Similarly in the second exemplary environment 1000, the first source device 10s1 undergoes the similar process of defining and configuring the nodes 1212. The first source device 10s1 possesses a first source device 10s1 communication node sic 1, which in this embodiment is a serial communication interface port. The serial port is connected to a serial port on the serial device server 1002, the serial1 node. The serial device server 1002 allows the server 100 to address the first source device 10s1 via a network interface on the server 1002 that is translated by the serial device server 1002 to serial communication via the serial1 node. Thus during the process of defining and configuring nodes 1212 and gathering 1210 device details for the first source device 10s1 and the serial device server 1002, an address for the serial device server is provided to the server 100 and the specific address or serial communication interface ports, in this example the serial1 node, is also provided to the server 100 to store in the environmental model in the database 202 thereby enabling the application service 306 to retrieve the environmental model configuration details from the system to communicate with the various devices. In a similar manner a second serial device server 1003 is addressed by the server 100.

In addition to defining and configuring the nodes 1212, the communication interfaces, ports, or communication nodes are setup and associated with a given device 270. The device driver includes or in alternative embodiments with generalized drivers the user inputs details of the nodes available and associated with a given device 270 in the environment. In the case of the second exemplary environment 1000, each device 270 in the environment has a number of nodes associated with it. As described above, one of the nodes associated with a given device is the communication node that enables communication between a given device 270 and the server 100 in order to receive configuration information, transmit to the server 100 specific device-generated messages, and to otherwise accept commands from the system. The second major category of nodes associated with a device 270 is nodes that enable devices in the environment to be linked together, or link nodes. These link nodes anchor each end of a static connection or link between devices 270 in the environment. A given device 270 may have several associated nodes, however the configuration of the environment may limit the number of nodes that are actually linked together with other nodes associated with other devices 270 in the environment. Thus part of the configuration task is defining and configuring nodes 1212 and defining static connections 1214. Although the configuration flow chart shows an idealized view of the system whereby the task of defining and configuring nodes 1212 appears to precede the step of defining static connections 1214; in most embodiments though, these tasks proceed in parallel for most systems. Namely, in conjunction with defining and configuring the nodes 1212 in the environment, the static connections or links within the environment between devices 270 are also defined 1214.

The device driver details for a given device 270 contain details on all of the nodes associated with that type, make, model and style of device 270. For example in the case of the third source device 10s3 depicted in FIGS. 10 and 11 of the second exemplary environment 1000, there is one third source device 10s3 command port s3c1 available for connection to the system, which as detailed above has specific capabilities and configuration details associated with a network command port. Similarly, the third source device 10s3 is associated with three interface nodes or link nodes, the first link node s3$n$1, second link node s3$n$2, and third link node s3$n$3. The device driver possesses the basic details of the characteristics and configurations of these interface nodes or link nodes associated with the third source device 10$s$3. For example, in one embodiment where the second exemplary environment 1000 is an audio-visual controlled environment where the third source device 10$s$3 is a DVD player 154, the first link node s3$n$1 is a be a stereo audio output while the second link node s3$n$2 is a composite video output and the third link node s3$n$3 is an VGA output. During the process of installing the third source device 10$s$3 into the second exemplary environment 1000 static connections, physical links, or simply links are established between specific nodes on the third source device 10$s$3 and other devices in the environment. These static interconnections reflect the actual routing of cabling or other physical or logical links established between devices 270 during installation and reflect linkages between the interface nodes that comprise the individual devices. Referring to FIG. 11 in this embodiment, a physical link or static connection established with the third source device 10$s$3 via the first link node s3$n$1 is the 10$s$3-10$i$2 link. This 10$s$3-10$i$2 link thus connects the third source device 10$s$3 through the first node s3$n$1 to the second interface device 10$i$2 via the second input node 10$i$2$n$2. By virtue of the physical connection established within the second exemplary environment 1000 between the devices 270 via the associated nodes on the devices it is possible to associate the nodes on both devices 270 with the ends static connection formed between the nodes as well as the devices 270 themselves. In this manner the process of defining static connections 1214 in the environment is together with gathering 1210 device details and configuring and defining and configuring nodes 1212 until all physical devices 270 and static connections in the second exemplary environment 1000 are input into the environment model.

In this manner, the system develops and stores a model of the environment to be controlled within the server 100. This model of the second exemplary environment 1000 and the devices 270 available in the second exemplary environment 1000 as developed and defined in the configuration process 1200, is stored in the database 202 and used by the application service 306 to address, communication, supervise and control the devices 270. The environmental model stored 1216 within the database 202 uses the details imported from the device driver files and the details of the actual installation to model the system relative to the details of the devices 270 and interconnections between devices 270 present, in this embodiment, in the second exemplary environment 1000.

The configuration process 1200 to gather 1210 device details, define and configure nodes 1212 and define static connections 1214 for a server 100 can occur during the initial installation of the server 100 for use in a given environment and can re-occur at any point in the future after the initial installation when other changes to the environment occur. These changes can range from the integration of new equipment or new capability devices 270 into the environment or loss, removal, or damage to devices 270, command links, or physical or static connections within the environment. Upon a change to the environment the configuration process 1200 is used to update the environmental model.

In some embodiments, when a given device 270 is removed from the environment and is no longer available for communication the server 100, the event handler can identify the repeated failures to communicate and power up a given device 270 that is otherwise configured within the system to be present and available in the environment. In these circumstances, the server 100 uses the event details and the failure of the device 270 to temporarily remove the non-responsive device 270 and all the device's 270 associated nodes from the working model that is stored by the application service 306 during operation based on the environmental model stored in the database 202. By removing a non-responsive element from the working model used by the server 100 to operate it is possible for the system to route around the malfunctioning or non-responsive device 270 and still function at the highest level possible. Further, the system possesses the ability to prompt the user to warn them that the system has unresponsive devices 270, thereby allowing the user to reconfigure the system by removing the unresponsive devices 270 from the environmental model or to dispatch a technician to repair the unresponsive or malfunctioning device 270. In this manner, the environment model is used to maintain system configuration details from use to use and is updated using the configuration process 1200 to model all of the devices 270 in the environment and their relationship to the environment and each other.

Automatic Configuration Via Import

In yet another embodiment of the system, an automatic configuration process is used to import the details of the second exemplary environment 1000 or upon the addition or deletion of one or more new devices 270 or static connections between devices 270. In this yet another embodiment, a computer aided drafting (CAD) program is used to develop and design installation drawings for the devices 270 and static connections within a given environment 110. One exemplary program used to develop these drawings is VizCAD. In this embodiment of the system, an importer is used to import the details from the drawings in the CAD system into the database 202. The importer effectively performs several steps in the configuration process 1200 by automating part or all of the process for inputting device details 1204, gather 1210 device details, defining and configuring nodes 1212, and defining static connections 1214 by using the same designs and drawings created as part of the original design process for the environment and using the same information used by the technicians that configured the devices 270, the static connections and the overall environment.

In one embodiment of the importer, a spreadsheet based, scripted application is developed to import design data from the CAD drawings. In one non-exhaustive embodiment Microsoft® Visual Basic for Applications (VBA) is used in conjunction with Microsoft Excel®. The drawing details are exported from the CAD program to an exported data file representing an ordered set of data representing the installed devices 270 present in the environment including any nodes associated with those devices and any static connections established between those nodes. The process starts with a CAD export process, whereby the data is exported into an intermediate structured or ordered set data file, such as a comma or tab delimited text file. The CAD export process is typically a form of a database query, such as a SQL-based query entered into an export engine native to the CAD program. This query, in one embodiment is manually entered by the user, in yet another embodiment the query is automatically retrieved from the CAD program by external query initiated by the importer.

The exported data file, or files depending on the details of the particular embodiment of the importer, is used to populate three data areas of the database 202—devices 270, device groups, and static connections. The information related to devices 270, or device information, includes its unique system name, manufacturer and model, input and output nodes, and extended properties which may have been added in CAD, such as purchase date, physical location within the facility, unique identifier or asset tracking codes. Device groups identify collections of linked devices 270 that are functionally or spatially related to each other. These device groups are often in the case of an embodiment of the system used for A/V applications representative of a single room in the presentation environment 110. The information related to static connections provides the routing details for any wiring or links that connect the nodes of individual devices 270 to other nodes through the environment 110. In the case of a presentation environment 110, the routing information contains details of signal type, for example audio and video signals.

In some cases, the importer abstracts additional details from the exported data file prior to import into the database 202 in order to remove or collapse specific details about the environment that the system does not or is not capable of manipulating. In one example, the video signal being carried by one embodiment of a static connection in a presentation environment 110 that is transformed from a standard VGA to an Ethernet-based signal and then back to VGA using three physical wires and one VGA-to-Ethernet and one Ethernet-to-VGA converters in order to transfer the signal over a greater distance is abstracted by the importer into a single static connection since the two converters are effectively transparent to the system. The importer abstracts or collapses these additional details during the conversion process. Specifically, the importer possesses a list of devices in a specific class, separate and distinct from the devices 270 that are controlled by the system, that provide conversion or signal boosting in the environment. In one form, these devices are simple direct input devices, meaning that they have one input node and one output node with no specifically controllable features that are addressed by the system. The no controllable features distinguishes them from other direct input devices such as windowing converters that are addressed by the system to convert a given video signal from one format (e.g. 4:3 ratio) to a second format (e.g. 16:9 ratio). The importer first identifies a connection to or from one of these simple direct input device in the data file obtained from the CAD design. When the importer locates a first simple direct input device, it then performs a search through all of the devices connected to the identified simple direct input device until it finds a matching simple direct input device. In this manner the importer logically connects and associates simple direct input devices and uses the identified relation to abstract them and eliminate them from the static connection that is imported into the system.

The importer leverages the data entered into the development of the design drawings in the CAD system thereby reducing the potential for transcription errors and speeding up the initial setup and maintenance of the system. In addition to speeding the population of the database 202, the intermediate translation of the data files exported from the CAD program in the spreadsheet provides a second reference for personnel using the system to identify specific aspects and details of the system. For example a technician troubleshooting a problem or installing the system can use the spreadsheet output to verify that specific static connections between devices 270 have been properly created per the desired design.

After the importer populates the database 202, the application service 306 identifies the devices 270 added to the environment and determines whether or not device drivers are available for each device 270. If a device driver is not available or the device 270 possesses additional configuration details or other configuration settings that were not represented in the CAD file the user is prompted to obtain the device driver files or enter the appropriate information for storage in the database 202.

Route Mapping

Once the environmental model is defined for the server 100 as part of the configuration process 1200, route map defining the full set of all possible connections and interconnections that can be established in the environment based on the available static connections, nodes associated with devices 270 and the devices 270 is created.

The process of generating a route map comprising the following steps is described in relation to the second exemplary environment 1000. The server 100 evaluates all of the source nodes and destination nodes associated with the sources 10s and outputs 10o available to the server 100 in the second exemplary environment 1000. The server 100 then generates the route map by finding all of the possible routes that can be established between each respective source and destination nodes associated with the sources 10s and outputs 10o. The route map is established from each destination node, input node, or input port of each of the outputs 10o, such as the output device 10o1, to any of the possible output ports or output nodes of the sources 10s that can supply the desired or appropriate types of signal, data, streams, or flows for the input nodes associated with the destination output device 10o1. The generation of the route map for a given presentation environment 110 is typically performed only when the server 100 is initially configured for the second exemplary environment 1000 or after changes have occurred. These route maps associated with a given environment 110, such as the second exemplary environment 1000 with its multiple interface devices 10i-10i3 respectively, are created by the system during initialization. This enables the system to determine whether or not all devices 270 in the environment 110 are responding to device commands prior to using the devices 270 as part of the available presentation route maps in a given environment. These route maps represent the physical effect of the specific configuration and capabilities of devices 270 installed in the environment as manifest within the environmental model.

Figure 13:
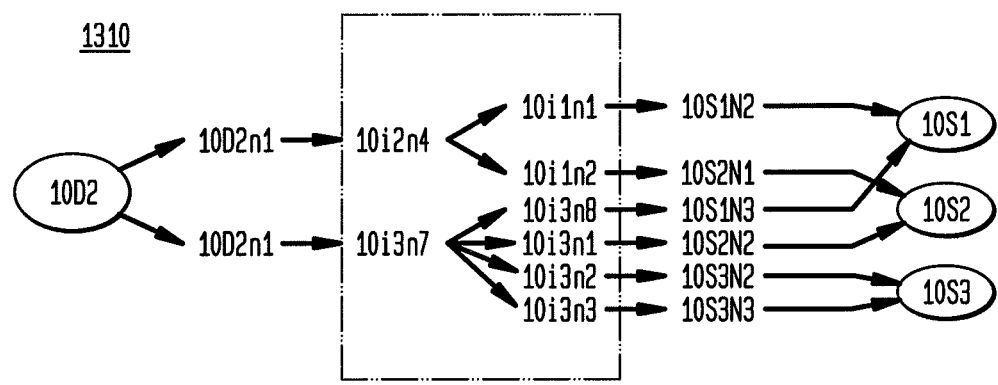
FIG. 13 is a first portion of an exemplary route map.

The route maps in one embodiment are represented as series of tree like structures that travel up the static connections or links between specific outputs 10o to connect to available sources 10s. Referring to the exemplary tree link maps in FIG. 13, all possible reverse paths between outputs 10o and sources 10s are represented within the route map. A first portion 1310 of a route map details all of the reverse links between the second output device 10d2 that link or form a connection with any of the sources 10s shown as reverse links. Each of the arrows in the first portion 1310 of a route map represents a static connection or link between singular nodes established within the second exemplary environment 1000 connecting one node to another. Nodes that have multiple connections between themselves and other nodes indicate that a selectable connection or link exists, such as that found in switches 10i. The first portion 1310 of a route map is formed for each of the outputs 10o by stepping through each and every connection from the node under consideration that leads to source nodes. In the case of an audio visual system, the route map is only formed 'upstream' meaning that connections are only followed in the opposite direction to the data flow—meaning in the case of an audio-visual system the route map is established in an anti-sense direction from the output device 130 to the input or source device 120. In this manner the route map is used to populate trees that detail all available links between sources 10s and outputs 10o from node to node. This then allows the routes to be represented as shown in FIG. 13 in the first portion 1310 of a route map After generating the route map all operations required by the server 100 prior to performing routing operations to form connections between sources 10s and outputs 10o in the second exemplary environment 1000 are completed. In one embodiment the route map is formed during the initial startup of the server 100 using the environmental model stored in the database 202. The route map is then loaded into a working model of the environment that is then manipulated during operation of the server 100 by the application service 306. In a second embodiment, the basis of initial route map is also stored in the database 202 for retrieval during startup to populate the working model of the environment used by the application service 306 during operation of the system. In both cases the working model of the environment is updated from the time-to-time during normal operation in response to changes in the server 100, including removing devices 270 from the working model due to events that have occurred or removing specific routes available based on other routes that are implemented as part of a scene being applied to the environment.

Intelligent Routing Engine

The intelligent routing engine or simply the routing algorithm is comprised of multiple discrete functions that operate together to identify routes and connections between sources 10s and outputs 10o suitable for the type of information or type of flow to be transferred or accommodated within and through the environment. The routing algorithm is implemented within the web server 200, within the application service 306, that is physically hosted on the server 100. The routing algorithm utilizes both dynamic (i.e. working model) and static (e.g. environmental model) application data 204 that is stored in the database 202 to create, identify, and establish valid connections between sources 10s outputs 10o located in an environment such as the second exemplary environment 1000. The Routing Algorithm is implemented as a functional element of the server 100 and is used during both initial configuration of the server 100 to establish initial routes when implementing a desired scene or whenever a new configuration of connections from a given source to a given output is required during operation.

The routing algorithm operates on the working model of the environment described above. The working model itself is derived from the environmental model established with the configuration 1200 process and stored in the database 202. Thus the routing algorithm identifies routes or paths through the environment for flows using the information and details input into the server 100 during the configuration 1200 process. Prior to starting the routing algorithm an environmental model and working model of the environment are created. The configuration 1200 process provides the environmental model with details of all the devices and specifics related to those devices 270 present within a given environment, including the communication and interface nodes associated with those devices and the respective static connections or links that connect the interface nodes between and within discrete devices 270 such as the sources 10s, outputs 10o and switches 10i.

The working model of the environment reflects the current state or status of the server 100, including the present states or configurations of each individual device 270 located in the second exemplary environment 1000 including controls 10e. The working model of the environment thus effectively represents a full state model, or configuration model of an arbitrary environment whereby static connections, device 270 details, and dynamic details (e.g. the linking or switching of two interface nodes in a switch 10i to select a specific path through the switch and link the respective static connections that terminate at interface nodes associated with the switch 10i) of the environment at a given time. The routing algorithm uses the working model to establish new connections or links between devices 270 located in the environment comprising a number of static connections or links along with the nodes that terminate each of the static connections and the devices 270 that are associated with those nodes. When a route is established each node along the path is effectively associated with two separate elements of the system, first the device 270 the node is associated with originally and the node is also associated with the route or link it is part of that is established through the environment to link a desired source 10s with a desired output 10o. The working model utilizes a routing map to reflects all available routes and connections that may be established in an environment. The routing algorithm uses the routing map and the respective trees representations of the routing maps, to determine available routes or paths between selected devices 270.

When a specific pair of devices 270 is selected to be interconnected in the interface layer or data layer either by the user directly during operation of the server 100 by inputting a desired pair of devices 270 to be connected through the user interface of the control client 102 or while implementing a new scene, the routing algorithm is used to determine the proper configuration or state for the system to adopt to accomplish the desired outcome. When the server 100 is initially starting up, and the environment is unconfigured and the devices are ready, but no routes or paths through the environment have been created, the routing algorithm is applied to a first pair of devices 270 to be connected within the environment and it determines the proper route, in other words the routing algorithm identifies the configuration of devices 270, including the device's associated nodes, and static connections interconnecting the associated nodes in order to create a path between the devices 270. The resulting path updates the working model of the environment to reflect the fact that a portion of the system within the environment is now dedicated to establishing a desired link between the sources 10s and the outputs 10o. By dedicating some links in the environment to this first route, there is an effective reduction in the total number of available routes and the application service 306 updates the working model to reflect this reduction in potential routes and the new states of the devices 270 implicated by the newly established route. The newly establish route is then queued for implementation in the environment via the server 100 issuing configuration commands to the devices 270 in the environment to establish the route that the algorithm has identified. During startup, the next pairing of devices 270 is used to establish a second route and so on until all pairs of devices are either connected or the system generates an event indicating to the user that the desired configuration cannot be created or another event occurs to interrupt the process.

A similar process is used to generate a route when a new pair of connections is desired after a scene is already implemented. For example if the system is already configured in a particular state to implement a specific scene, the working model holds the device states to implement that scene. Upon shifting to a new scene the application service 306 updates the working model on the server 100 to reflect any presently configured routes that are no longer needed in the new scene and proceeds to form any new routes required by the new scene. The routing algorithm is applied to the working model to determine the desired device 270 states to implement the new routes required by the new scene.

The intelligent routing algorithm, or simply routing algorithm uses a recursive algorithm to traverse the available nodes and static connections or links available to traverse across the system from the desired output 10o to the desired source 10s. In this manner the routing algorithm identifies a desired path through the environment comprising at least the desired source 10s and desired output 10o device and at least one nodes associated with each of those sources 10s and outputs 10o and the static connections that terminate with those respective nodes. In one embodiment of the system a recursive algorithm is used to traverse the routing maps to identify the desired route. Different embodiments of the routing algorithm use different types of search routines, including the following recursive search algorithms: breadth-first search, depth limited search, A*, Dijkstra's algorithm, best-first search, and dynamic programming generally. Alternative algorithms including non-recursive and non-traditional algorithms are available for use by those of ordinary skill in the art.

In one embodiment of the system a recursive depth first search algorithm is used to traverse the routing tree starting with the output 10o device. The output 10o device is effectively the root of the tree. There can be one or more input nodes or input ports associated with the output 10o device. If the desired input is capable of providing signals that can be accepted by any of the input nodes associated with the desired output 10o device, then all possible input nodes associated with the output device in the environment are considered, otherwise only the reduced number of input nodes associated with the output 10o device are considered. The routing algorithm starts with the selected output 10o device and evaluates any static connections available from input nodes associated with the selected output 10o device that it then traverses or 'travels' away from the output 10o toward the source 10s. The depth first search algorithm prioritizes driving directly toward the goal of the source device at the expense of potential dead-end routes. Thus the routing algorithm travels along the static connection that terminates at the input node associated with the output 10o device to the other terminating node of the static connection. The other terminating node of the selected static connection is associated with a second device 270 in the environment, including switches 10i, sources 10s, and in some embodiments other outputs 10o. The algorithm then evaluates the other nodes associated with this second device in the environment that are able to switch and connect with the present node to determine whether any of the nodes offer the ability to leave the second device and continue toward the desired destination, namely the desired source 10s. If another node associated with second device exists that terminates a second static connection, the routing algorithm follows this path to the node associated with the other terminus of the second static connection and the third device associated with the that node. In this manner the routing algorithm follows the static connections through each connection's terminating nodes and the associated devices to the desired source 10s. The same process is repeated for each node associated with a given device until either a route to the desired source 10s is identified or a dead-end is found, meaning there are no available connections to follow away from a non-desired device. Upon identifying a dead-end, the algorithm returns to the immediately prior device and evaluates the next unevaluated node available on the immediately prior device until there are no remaining unevaluated nodes on the immediately prior device, at which point the algorithm considers the next prior device. If after traversing all of the connections traveling away from the output 10o and being unable to identify a route to the desired source 10s, the routing algorithm will determine that no route is available and report the error via an event trigger.

If the algorithm is successful in identifying a route to the desired source 10s, the routing algorithm reports back the desired configuration of static connections, nodes that terminate the static connections, and the devices that are associated with the nodes to be configured in order to create the desired route through the environment. The reported route, including devices and associated nodes to be configured is then marked within the working model to indicate that the reported route, including all nodes and associated devices along the route are included in the identified route and no longer available for other routes, and the working model properly reflect the dedication of a portion of the environment to route. The identified route is then passed to the application service 306 that issues the commands using the environment model and device driver details to the devices 270 and the associated nodes to establish the route in the second exemplary environment 1000.

INDUSTRIAL APPLICABILITY

Control of Multiple Audio Visual Components

The present system and method disclosed herein in embodiments for use with presentation environments 110 possesses a multiple capabilities to perform a plurality tasks. Specifically the system and method enables the management of complex connections between the devices, including sources and output devices 270 of A/V data and enables the control of devices, including sources and output devices 270 of A/V data and other presentation environment 110 environmental devices 142 without requiring full configuration paths for all the equipment. Second, the system and method auto-generates user interfaces with appropriate controls for a given presentation environment 110 based on the types of devices 270 and environmental devices 142 available. Third the system and method enables control of specific scenes and presentation control to allow complex multitasking and integration of multiple devices 270 and controls 142 to act in concert with a mere press of a button to configure a presentation environment 110. The self-generating user interface enables the server 100 to connect with a variety of different control clients 102, including those that have never connected to a particular environment before, and provide a user interface tailored for the presentation environment 110 to be controlled. Finally, since the system and method is based on a client server architecture with access and communication through standard computer networks, such as IP based networks like the Internet, the server 100 can be located in any geographic location with no impact on the control of a given presentation environment 110 thus enabling centralized management, portability, transportability, and consistent user interface across an entire enterprise. These specific capabilities enabled by embodiments of the present system and method and others inherent within the system and method disclosed are obvious to one of ordinary skill in the art and this listing is merely provided as a non-exhaustive set of examples.

Control of Integrated Building Systems

Yet another exemplary application of the present system for managing, routing and controlling devices in an environment is to control the various devices 270, environmental devices 142 present in an integrated building. In this application the system is used to direct the operation of specific devices 270 in the environment, including sources 10s such as chillers to produce cool air or a dehumidifier that reduces the relative humidity content of air present in a heating ventilation and air conditioning (HVAC) system. The system directs the operation of the sources 10s to generate conditioned air, then various switches 10i, or flow control devices such as controllable dampers and mixers are used to mix and distribute the conditioned air through a system of physical connections, static connections, or more generally links present the environment (e.g. ducts or pipes) for distribution to specific output devices located in the areas to accept the conditioned air. The effect of the distribution of the conditioned air is then monitored by communication with environmental device 142 sensors located in the environment that monitor the environment. In a similar manner the system is able to connect the environment devices 142 actuators present in the environment to change the overall characteristics of the building, such as adjusting lighting in response to ambient light sensors or automatically dimming windows in response to direct sunlight. Similar control can be applied other building systems, including security, fire and safety and other building systems.

Control of Flexible Manufacturing and Process Equipment

In still another exemplary embodiment, the present system for managing, routing and controlling devices is used to control systems and equipment present in a flexible manufacturing facility or chemical process facility. In a flexible manufacturing environment there are multiple devices that are classified as sources 10s capable of generating a partial or fully completed product or intermediary product. These sources 10s need commands to provide or start their respective process of generating product. The resulting product then is routed between other devices 270, that can simultaneously operate as both consumer devices or outputs 10o and sources 10s—namely by accepting partially completed product, performing additional operations, and then outputting the transformed product to another output 10o. In this manner the system treats the source 10s, outputs 10s, and combined source and output devices present in a facility as any other sources 10s to be controlled and the product is routed between the devices by commanding switches 10i manifest as switching equipment, pipe valves, diverters, flexible conveyor belts or semi-autonomous skillets to establish connections or links between the desired sources 10s and consumer or output 10o devices and establish links to route the product between devices. In a similar manner, various sensors for detecting and evaluating the quality of the product provides feedback to the system during operation allowing corrective action to be taken if necessary. In a manufacturing environment sensors environment devices 142 include: temperature sensor, pressure sensor, flow-rate sensor, accelerometer, humidity sensor, radio frequency identification tag reader, finger-print scanner, optical scanner, proximity detector, spectrometer, load sensor, force sensor, and ultrasonic sensor.

CONCLUSION

While various embodiments of the present system and method for controlling devices and environments have been described above, it should be understood that the embodiments have been presented by the way of example only, and not limitation. It will be understood by those skilled in the art that various changes in form and details may be made therein without departing from the spirit and scope of the invention as defined. Thus, the breadth and scope of the present invention should not be limited by any of the above described exemplary embodiments.

We claim:

1. A method for controlling an environment, comprising:
Accessing a server associated with the environment via a control client;
Logging into said server as a user, wherein said server queries a user database to retrieve rights and configuration data associated with said user;
Rendering a control panel on said control client, wherein said control panel is adapted to the environment based on said rights and said configuration data;
Creating a user defined configuration of a source device, an output device, and a device associated with the environment;
Generating a desired path in the environment based on an environment model to connect said source device to said output device and adapted to allow signal transfer between said source device and said output device, wherein said environment model is stored in a data structure on said server;
Identifying an event generated by an event generator, wherein an event handler responds to said event;
Triggering one or more commands to selectively interconnect an output port of said source device to an input port of said output device in response to said event;
Communicating said one or more commands from said server to a control switch;
Sending a command from said server to command said source device to output a signal; and
Outputting said signal on said output device.

2. The method of claim 1, further comprising:
Transmitting said signal to a conversion device adapted to receive said signal;
Communicating desired conversion type information from said server to said conversion device;
Converting said signal to a reformatted signal using said desired conversion type information; and,
Outputting said reformatted signal from said conversion device to said output device.

3. The method of claim 1, further comprising:
Identifying an identified device from a list of said source device, said control device, and said configuration device;
Contacting a remote server and requesting a license to use a device driver adapted to interface with said identified device;
Encrypting and transmitting said license to said server using a one-way key stored on said remote server;
Decrypting said driver using a second one-way key located on said server, wherein said one-way key and said second one-way key are related asymmetric encryption an decryption keys; and,
Installing said device driver for said identified device.

4. The method of claim 1, further comprising:
Determining whether an additional device driver installation is authorized;
Contacting a remote server to request a license modification;
Generating said license modification specific to said server to allow said server to install and operate said additional device driver using a one-way key located on said remote server;
Transmitting said license modification to said server;
Decrypting said license modification using a second one-way key located on said server; and,
Installing said license modification on said server authorizing the installation and operation of said additional device driver.

5. The method of claim 1, whereby said rendering said control panel is adapted to said control client's capabilities using a control client driver dataset stored on said server and said rendering further comprises creating a control sub-panel for a permitted device on said control panel, wherein said control sub-panel is based upon said control client driver dataset and said user.

6. The method of claim 1, further comprising controlling a first device associated with the environment and controlling a second device associated with the environment by issuing commands to said first device and said second device from said server.

7. The method of claim 6, wherein said rendering creates a zone control interface adapted to accept a single user input and translate said single user input into a first output and a second output, whereby said translate uses a pre-defined relationship between said first output and said single user input and said second output and said single user input, and whereby said controlling further comprises issuing said first output to said first device and said second output to said second device.

8. The method of claim 1, whereby said output port of said source device is connected to an input node of said control switch by a first static connection and said output node of said control switch is connected to said input port of said output device by a second static connection, wherein said control switch responds to said commands by forming an operable connection between said input node and said output node to allow said signal to flow through said first static connection and said second static connection.

9. The method of claim 8, further comprising:
Inputting a set of environment elements comprising said first static connection, said second static connection, said source device, said output device, and said control switch to create said environment model and storing said environment model in a device interconnection and routing database;
Identifying said desired path by applying a recursive algorithm to said environment model to identify a reverse path from said output device to said source device; and,
Updating said environment model with an attribute to indicate which said environment elements are part of said desired path.

10. The method of claim 9, further comprising:
Storing said user defined configuration in said device interconnection and routing database; and,
Retrieving said environment model and said user defined configuration from said device interconnection and routing database.

11. The method of claim 10, wherein said retrieving said environment model and said user defined configuration is triggered by receipt of said event.

12. The method of claim 1, wherein said event is selected from the group consisting of: a user input to said control client, a pre-defined timer present within said server, an alarm set for a specific time of day, and an external interface device possessing an external device interface port adapted to communicate with said server.

13. A method for configuring information flow in an environment, comprising:
mapping static connections in the environment between a plurality of devices associated with the environment, wherein said static connections define paths between said plurality of devices, and allow the information flow;
selecting a source device from said plurality of devices, wherein said source device possesses at least a first source device output port;
selecting an output device from said plurality of devices, wherein said output device possess at least a first output device input port;
receiving an event generated by an event generator;
applying a means for identifying a reverse path through said static connections from said first output device input port to said first source device output port with a recursive algorithm at least in part in response to receipt of said event;
selecting a subset of devices from said plurality of devices that are connected by said reverse path through said static connections; and,
configuring said subset of devices to accept the information flow from said first source device output port and route the information flow via a dedicated, non-shared, subset of said static connections to said first output device input port.

14. The method of claim 13, further comprising:
storing said mapping of and a set of attributes for said static connections and said plurality of devices in a database;
loading into a working model said set of attributes;
updating said working model with an indictor that at least one of said static connections and said subset of devices are interconnected; and,
reducing said static connections in said working model to create a reduced set of static connections by removing said static connections marked with said indicator such that said applying only identifies a reverse path through said reduced set of static connections.

15. The method of claim 14, whereby said configuring further comprises querying said working model to retrieve said indicator, using said indicator to determine if a specific device, of said plurality of devices is configured to accept the information flow, and only performing said configuring if said specific device is not configured to accept the information flow.

16. The method of claim 13, further comprising:
selecting a switch device from said plurality of devices, said switch device comprising a first input node, a second input node, a first output node, and a second output node, whereby at least one static connection terminates at each of said first input node and said second input node and at least one static connection terminates at each of said first output node and said second output node;
selectively connecting said first input node to one of the following selected from the group consisting of said first output node, said second output node, and a termination;
selectively connecting said second input node to one of the following selected from the group consisting of said first output node, said second output node and a termination; and,
whereby said configuring said subset of devices is triggered by said event.

17. The method of claim 13, further comprising:
grouping said subset of devices into a logical grouping stored in a database;
addressing said subset of devices via said logical grouping; and,
retaining configuration information for each of said subset of devices in said database.

18. The method of claim 17, further comprising:
retrieving device information from said database for representing a selected device from one of said subset of devices;
retrieving a device driver associated with said selected device; and, whereby said configuring said subset of devices further comprises addressing said selected device using said device information and communicating a command to said selected device using said device information and said device driver.

19. The method of claim 13, whereby said recursive algorithm is a depth first search.

20. The method of claim 13, wherein said event is selected from the group consisting of: a user input, a pre-defined timer present within said server, an alarm set for a specific time of day, and an external interface device possessing an external device interface port adapted to communicate with said server.

* * * * *